Sept. 25, 1951 L. KARDORFF 2,569,174
THERMOPLASTIC INJECTION MOLDING APPARATUS
Filed Dec. 7, 1948 12 Sheets-Sheet 1

INVENTOR.
LEON KARDORFF
BY Edwin Levisohn
ATTORNEY

Sept. 25, 1951            L. KARDORFF            2,569,174

THERMOPLASTIC INJECTION MOLDING APPARATUS

Filed Dec. 7, 1948            12 Sheets-Sheet 2

*INVENTOR.*
*LEON KARDORFF*
BY
*ATTORNEY*

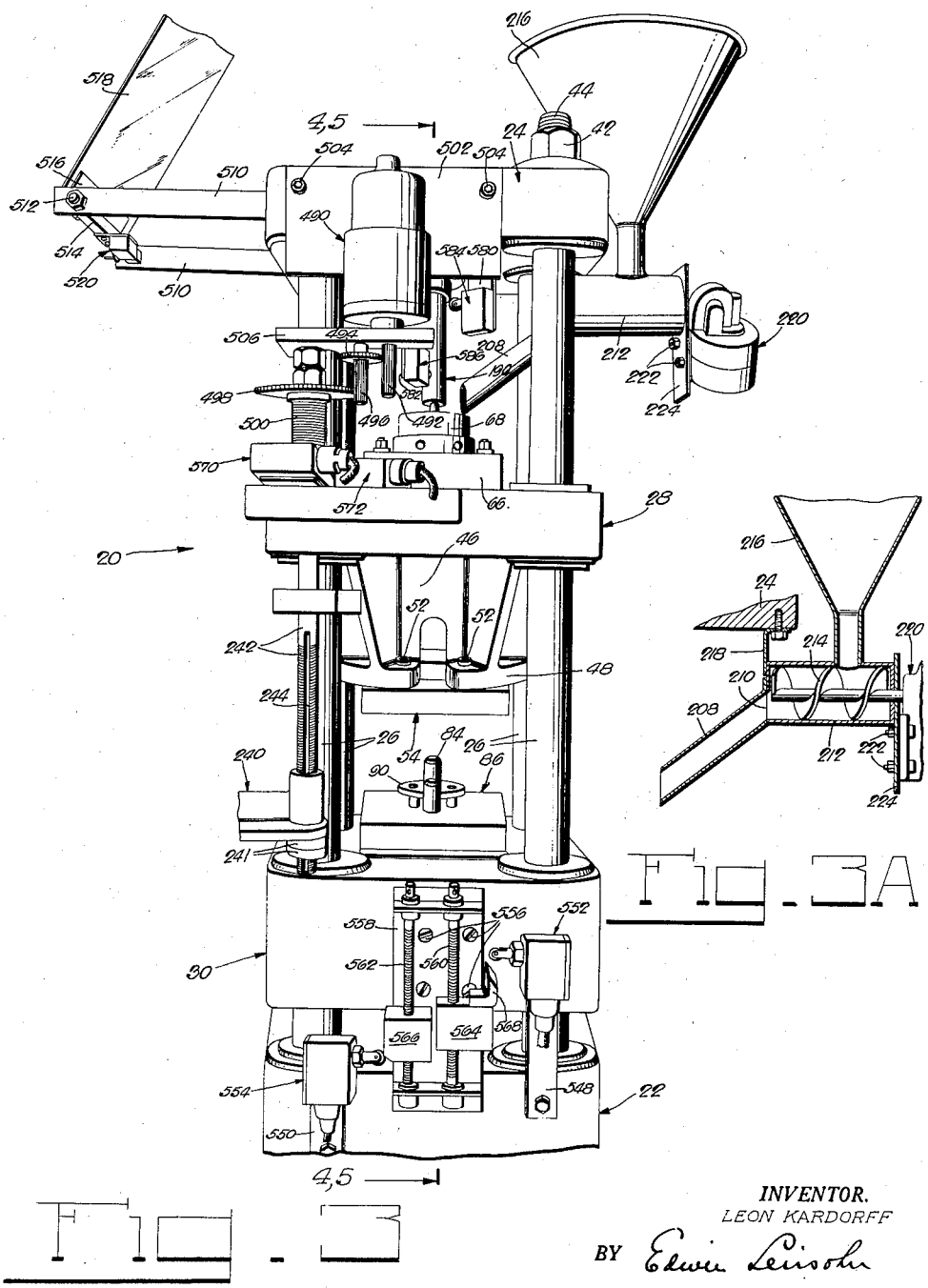

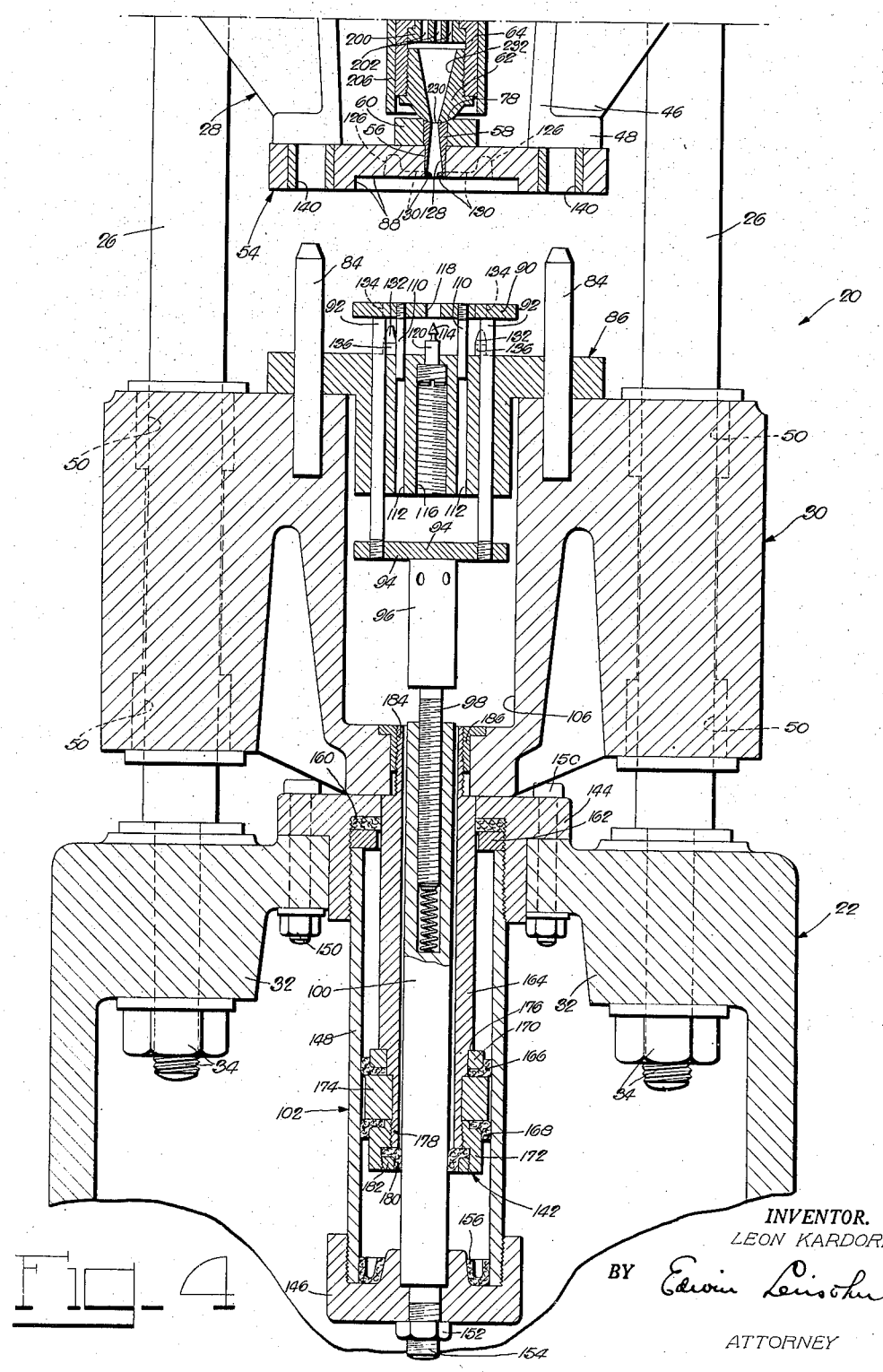

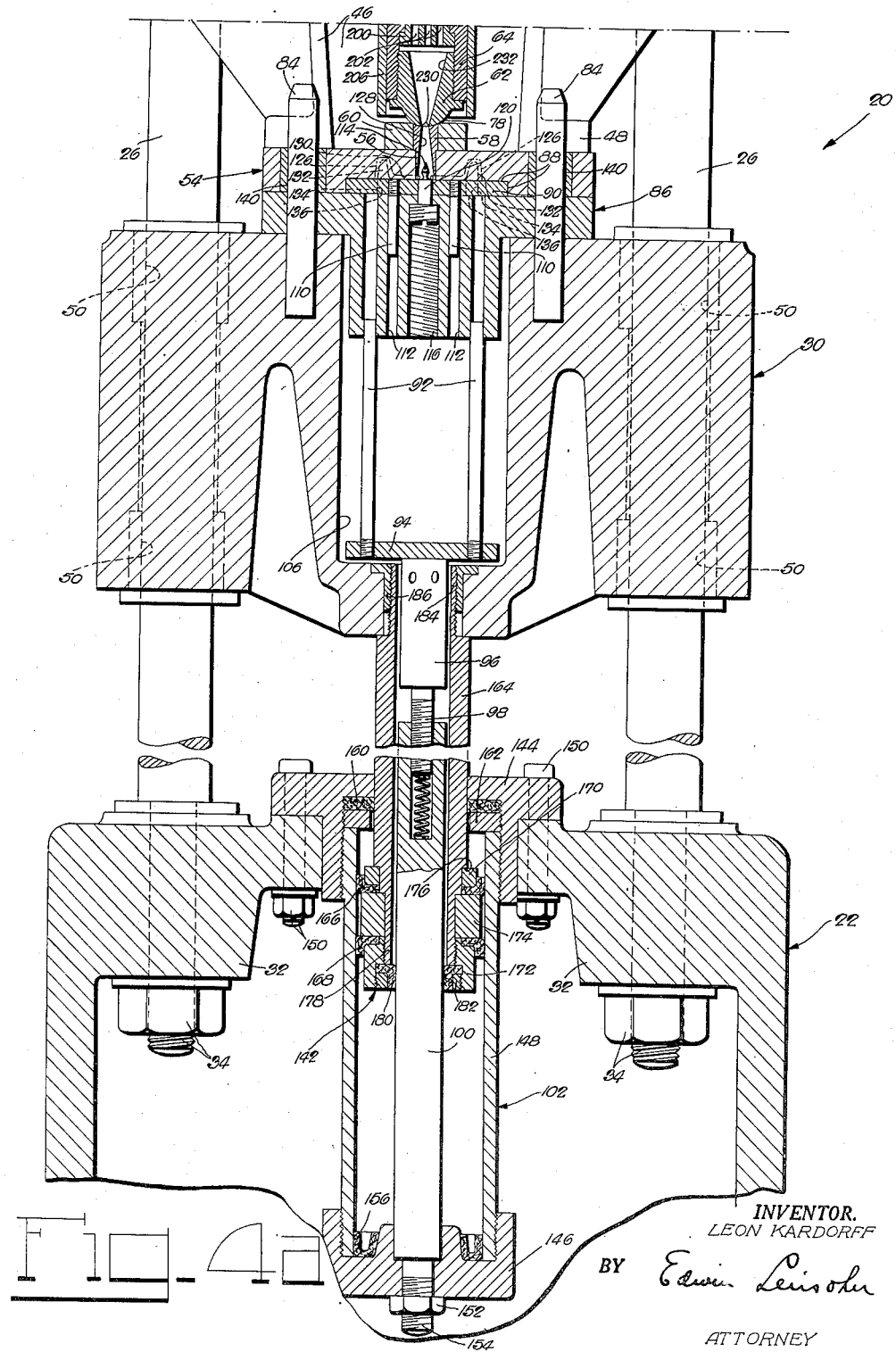

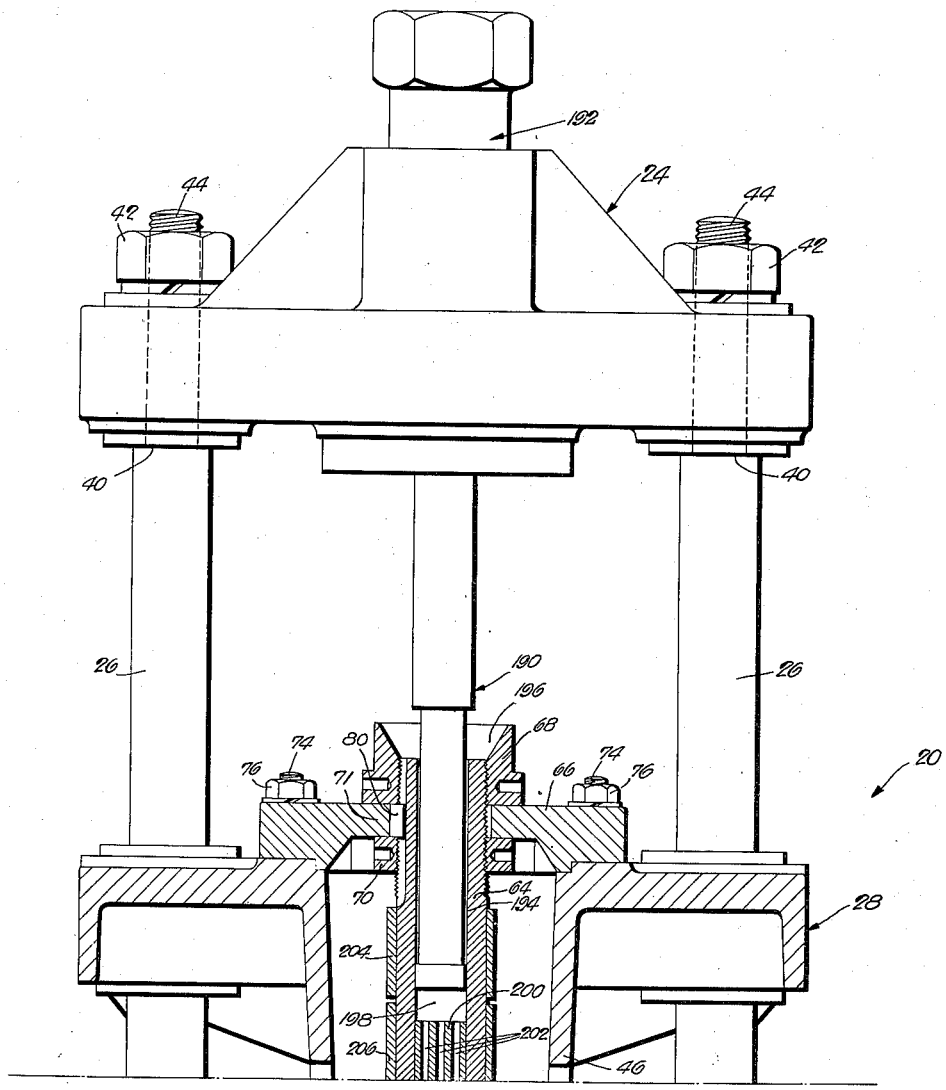

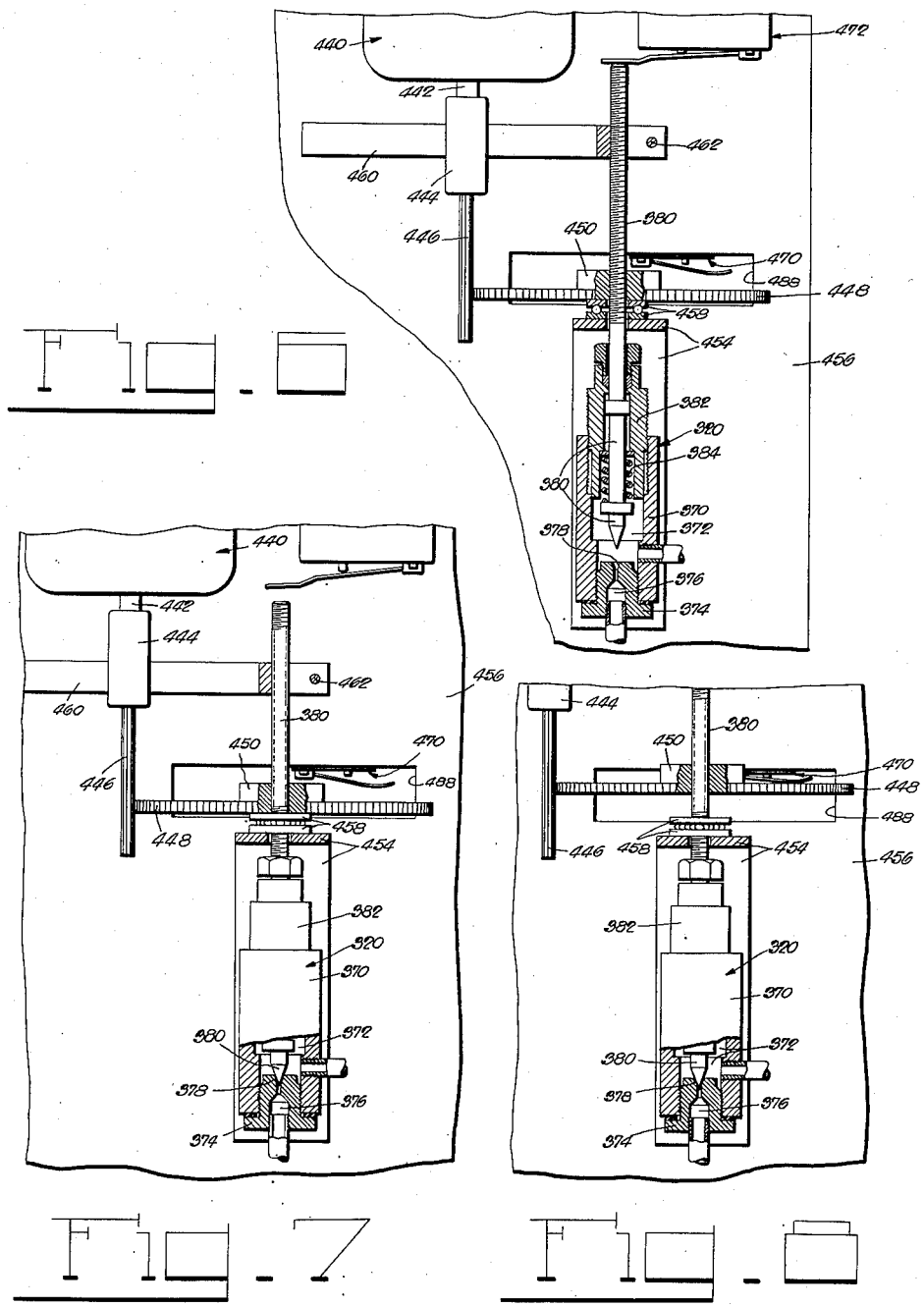

Sept. 25, 1951 L. KARDORFF 2,569,174
THERMOPLASTIC INJECTION MOLDING APPARATUS
Filed Dec. 7, 1948 12 Sheets-Sheet 8
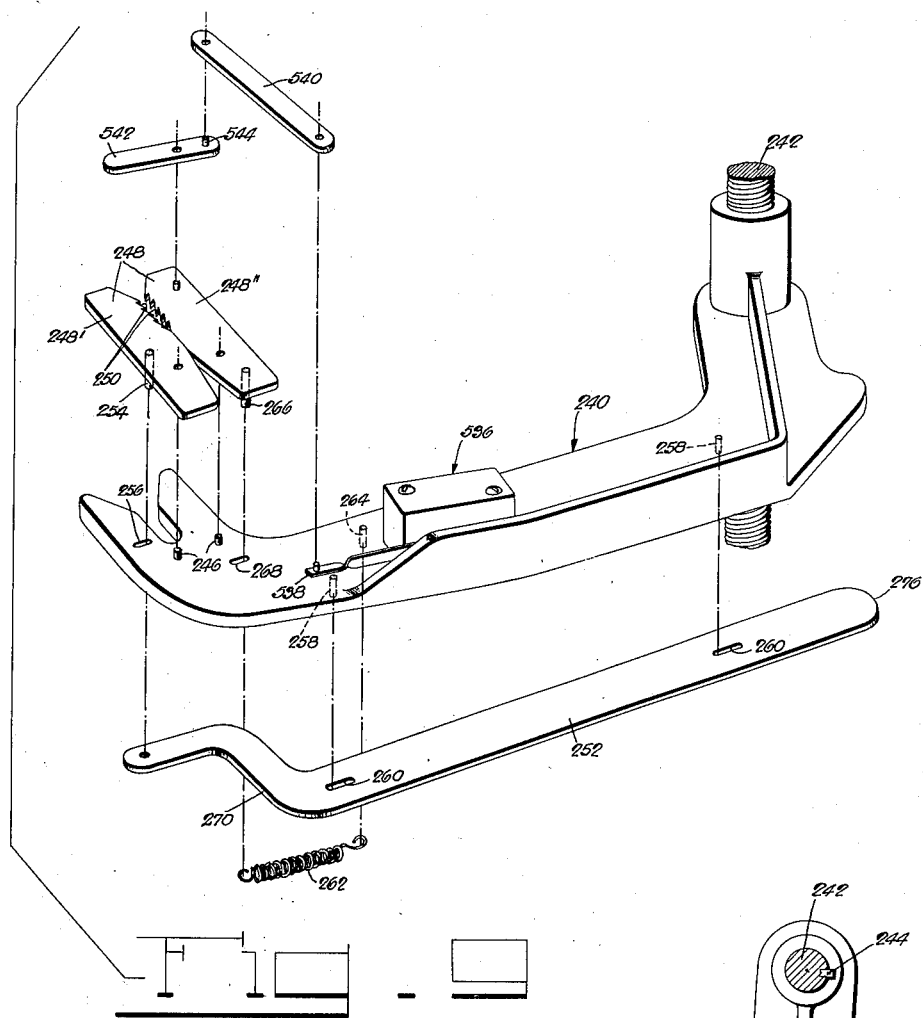
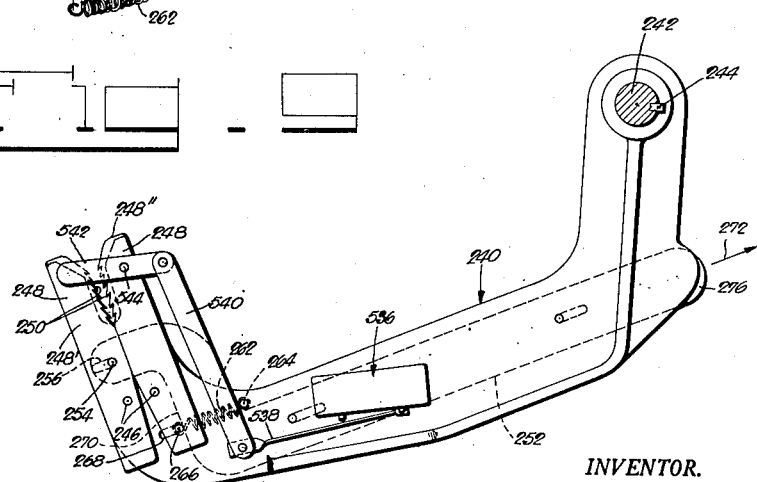
INVENTOR.
LEON KARDORFF
BY *Edwin Leisher*
ATTORNEY Sept. 25, 1951     L. KARDORFF     2,569,174
THERMOPLASTIC INJECTION MOLDING APPARATUS
Filed Dec. 7, 1948     12 Sheets-Sheet 9
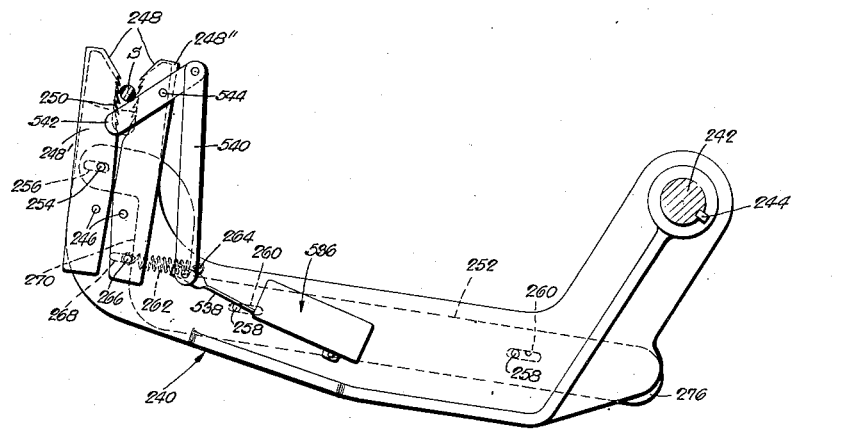
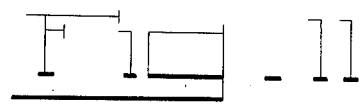
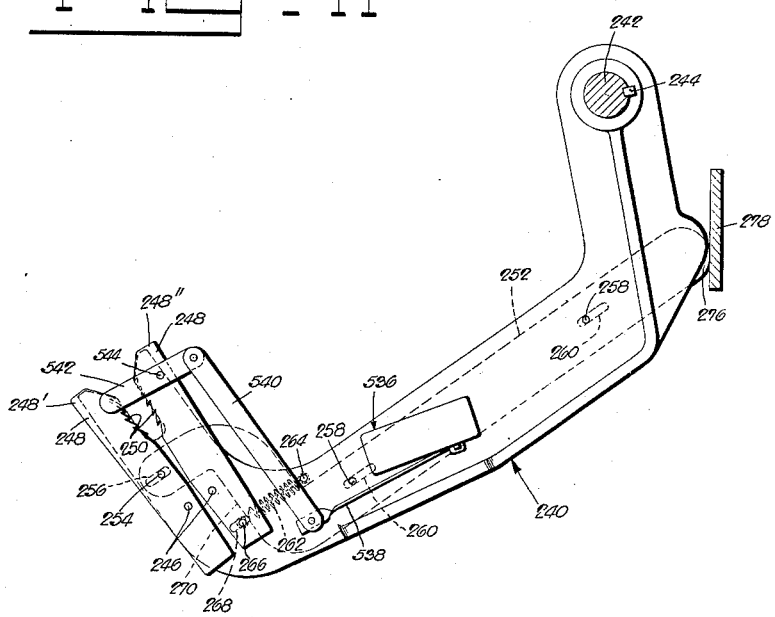
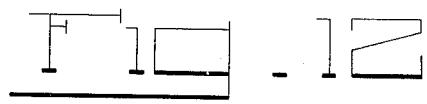
INVENTOR.
LEON KARDORFF
BY Edwin Linsohn
ATTORNEY Sept. 25, 1951            L. KARDORFF            2,569,174
THERMOPLASTIC INJECTION MOLDING APPARATUS
Filed Dec. 7, 1948                                   12 Sheets-Sheet 10
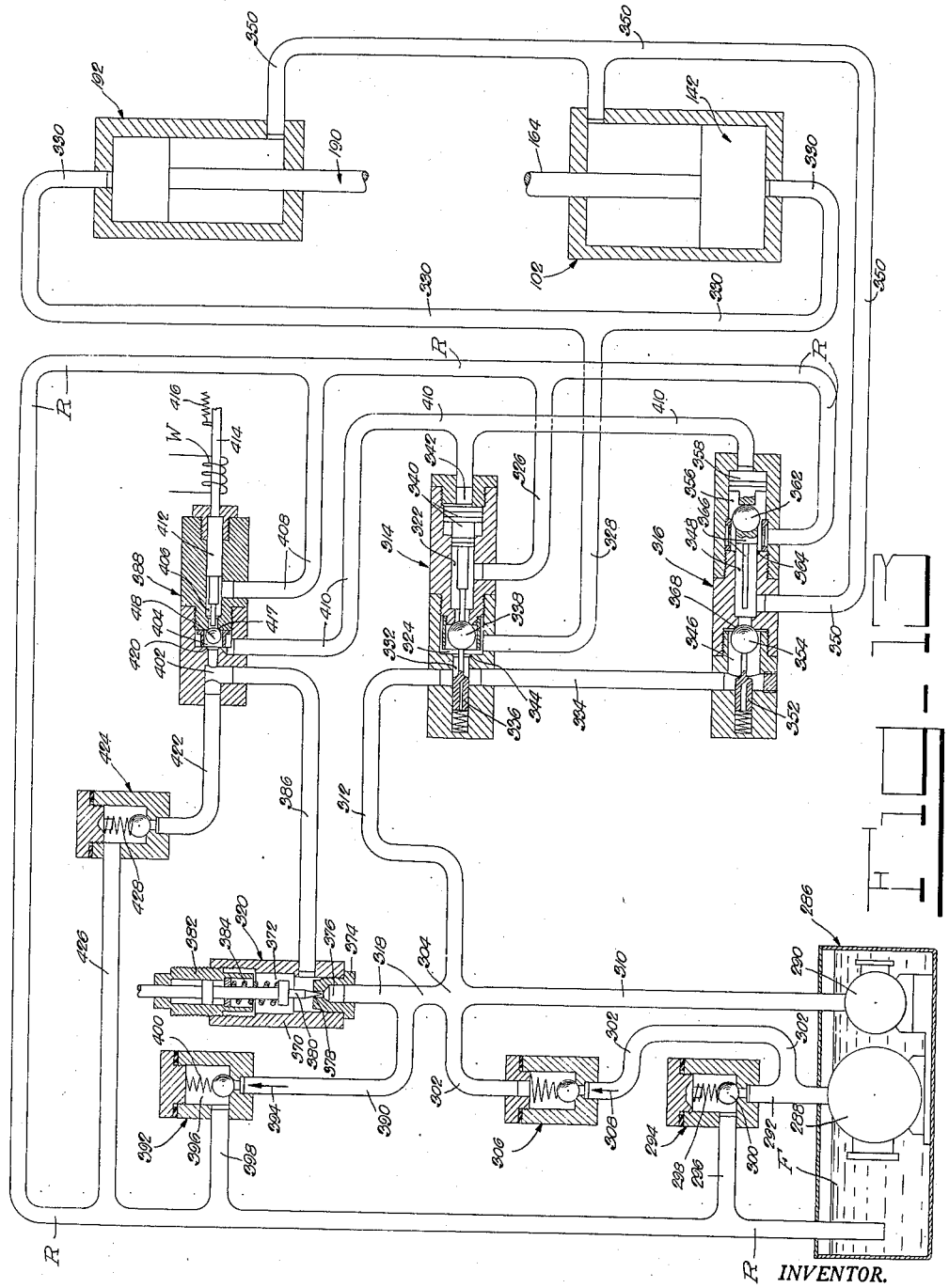
INVENTOR.
LEON KARDORFF
BY
ATTORNEY Sept. 25, 1951 L. KARDORFF 2,569,174
THERMOPLASTIC INJECTION MOLDING APPARATUS
Filed Dec. 7, 1948 12 Sheets-Sheet 11
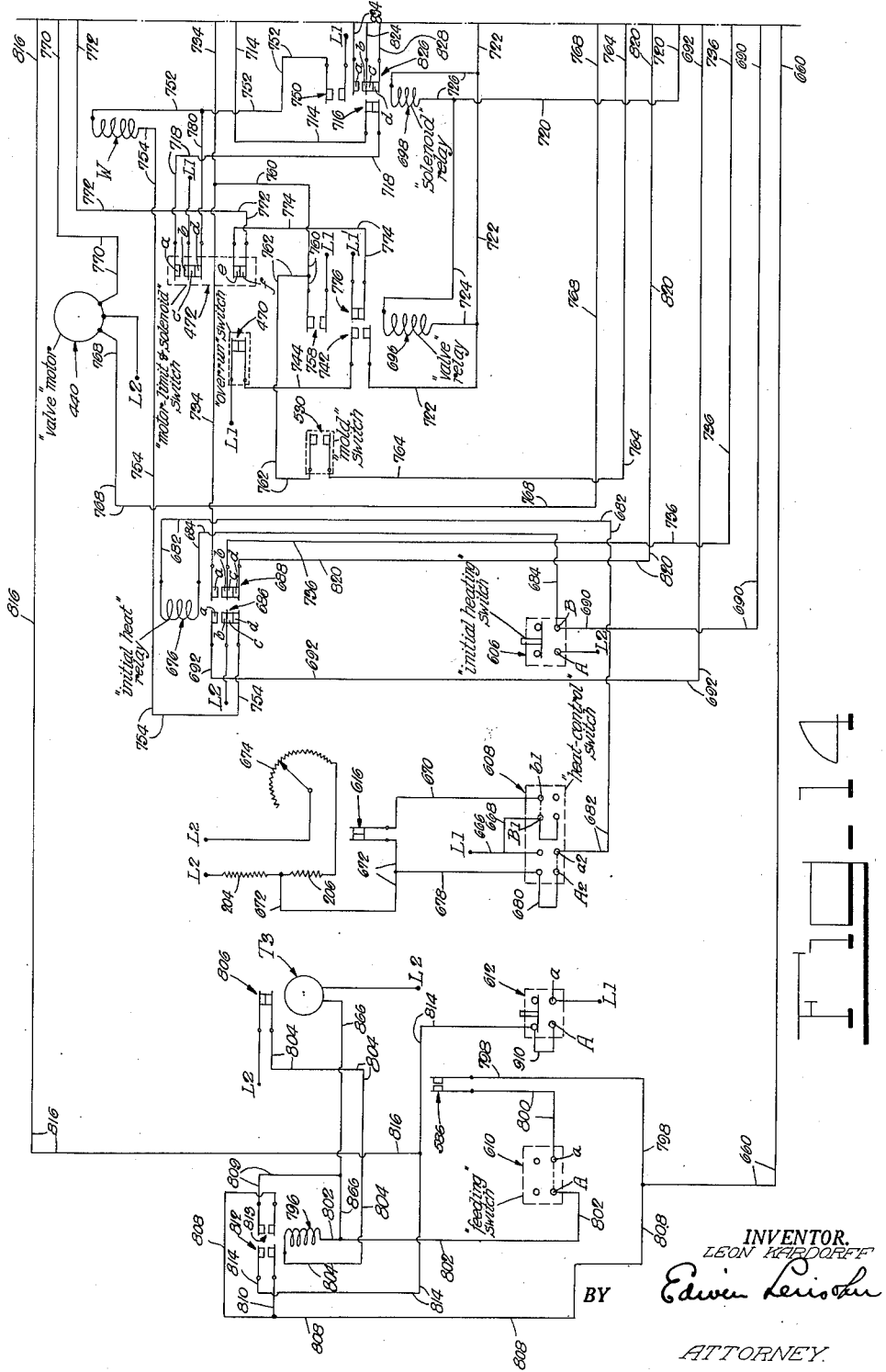
INVENTOR.
LEON KARDORFF
BY Edwin Levisohn
ATTORNEY.

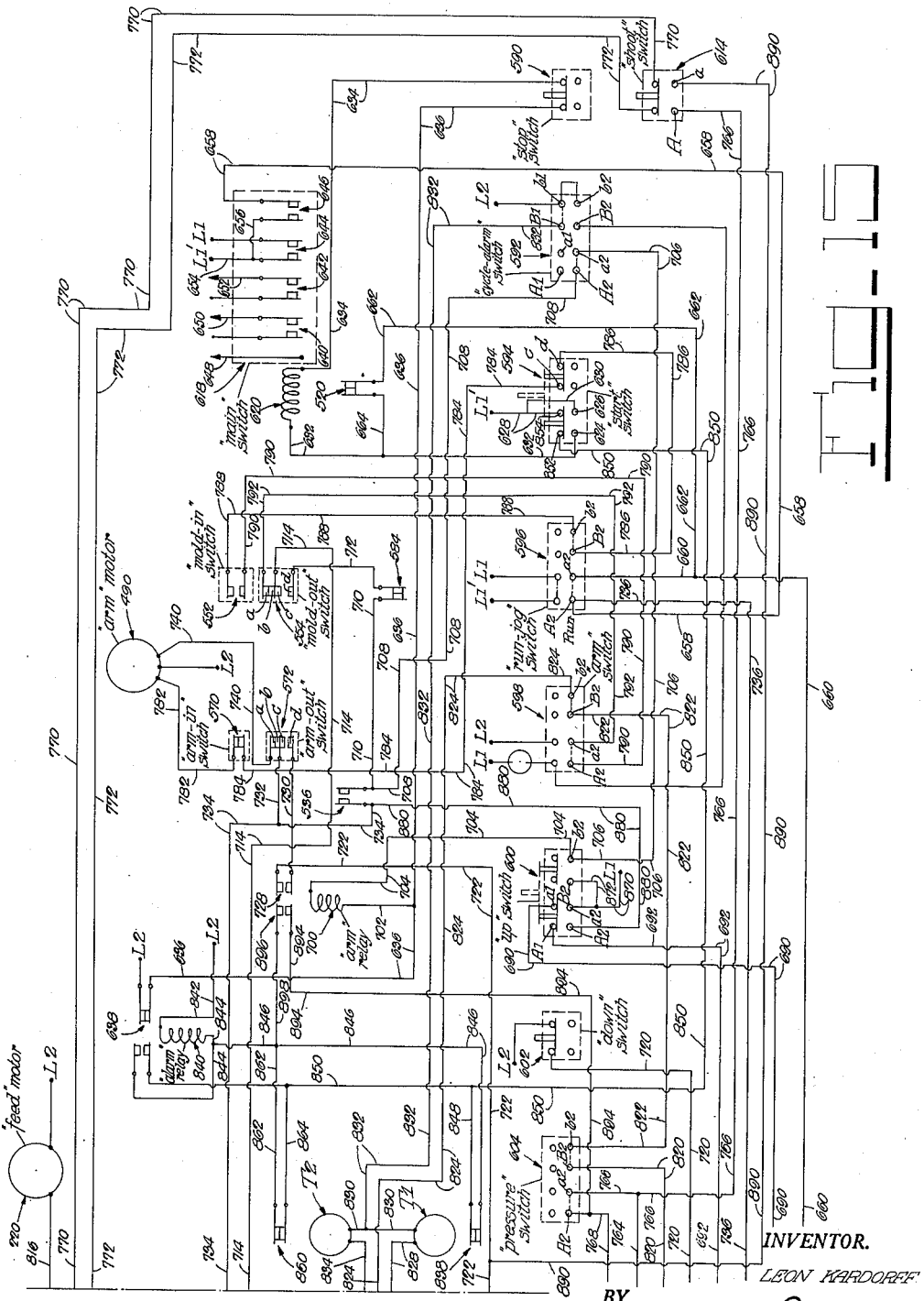

Patented Sept. 25, 1951

2,569,174

UNITED STATES PATENT OFFICE 2,569,174

THERMOPLASTIC INJECTION MOLDING APPARATUS

Leon Kardorff, Jackson Heights, N. Y., assignor to Automatic Injection Machines Corp., New York, N. Y., a corporation Application December 7, 1948, Serial No. 63,975

18 Claims. (Cl. 18—30)

This invention relates to thermo-plastic injection molding apparatus.

It is the primary aim and object of the present invention to provide apparatus of the above type which, while rugged and comparatively simple in construction, may be operated automatically for any length of time during which it will perform efficiently and reliably without requiring human supervision or control other than starting and stopping the apparatus.

It is another important object of the present invention to provide in apparatus of this type automatic controls which to a large extent obviate the rise of certain critical operating conditions of the apparatus that heretofore resulted frequently in inferior or totally unsatisfactory molding.

It is another important object of the present invention to make provisions for automatically stopping the operation of the apparatus if in the course of any operating cycle thereof there will arise, despite the automatic controls, any one of a number of certain operating conditions of the apparatus which, if unchecked, would result in unsatisfactory molding or damage to the apparatus, or both.

It is another important object of the present invention to design the controls of the apparatus so that, for the start of a production run of the latter after prolonged idleness, an operator need merely manipulate certain controls at one brief time interval in order subsequently to cause the apparatus to melt solid plastic and heat it to correct molding temperature, and thereafter automatically perform in repeat-molding cycles, without any further manipulation or supervision by the operator.

It is another important object of the present invention to make provisions in the controls of the apparatus for operating the later in single molding cycles, each in response to momentary manipulation by an operator of certain controls.

It is another important object of the present invention to provide for facile substitution of different molds in the apparatus, and for facile adaptation of the controls of the apparatus to different substituted molds in the latter.

It is another important object of the present invention to make further provisions in the controls of the apparatus for interrupting any operating cycle thereof immediately on momentary manipulation by an operator of a single control, thus affording the possibility of preventing unsatisfactory molding or possible damage to the apparatus for any reason whatsoever.

It is another important object of the present invention to attain maximum efficiency and productivity of the apparatus, by timing the performances of the various operating mechanisms of the apparatus with a view toward attaining operating cycles of minimum duration.

It is another important object of the present invention to provide in the controls of the apparatus timing equipment which not only stops the apparatus automatically during any operating cycle of excessive duration, but also clearly indicates the particular operating mechanism or mechanisms responsible for the excessive duration of the cycle.

It is another important object of the present invention to provide the apparatus with equipment for automatically ejecting the molded product from the apparatus at the end of each molding cycle of the latter.

It is another important object of the present invention to coordinate the controls of the apparatus with the ejection equipment thereof, to the end of making an automatically or manually started repeat-molding cycle of the apparatus contingent upon the actual performance of the last step in the preceding operating cycle thereof, i. e., ejection of the molded product from the apparatus.

It is another important object of the present invention to resort in any operating cycle of the apparatus to fluid under low pressure for quickly closing the mold, and to make the subsequent application of fluid under high pressure, for keeping the mold closed for the actual molding operation as well as for the continuation of the cycle beyond mold closure, contingent upon actual closure of the mold, thereby to prevent closure of the mold with a force that would sooner or later be damaging to the same, as well as to prevent injection of a plastic charge into the mold if the same is not completely and safely closed.

It is another important object of the present invention to make provisions in the controls of the apparatus for permitting an operator to jog the mold, by power and in any desired steps, into its closed and open positions without causing any other operation of the apparatus, thereby facilitating the task of setting the apparatus up with different molds, for instance.

It is another important object of the present invention to make further provisions in the controls of the apparatus for permitting an operator harmlessly to shoot or eject, by power, from the injection nozzle of the apparatus plastic which is burned or otherwise unsuited for molding.

The above and other objects, features and advantages of the present invention will be more fully understood from the following description considered in connection with the accompanying illustrative drawings.

In the drawings:

Figs. 2 and 3 are fragmentary perspective views of the same apparatus, viewed from opposite sides, respectively;

Fig. 3A is a fragmentary section through certain plastic-feeding equipment of the apparatus;

Figure 1:
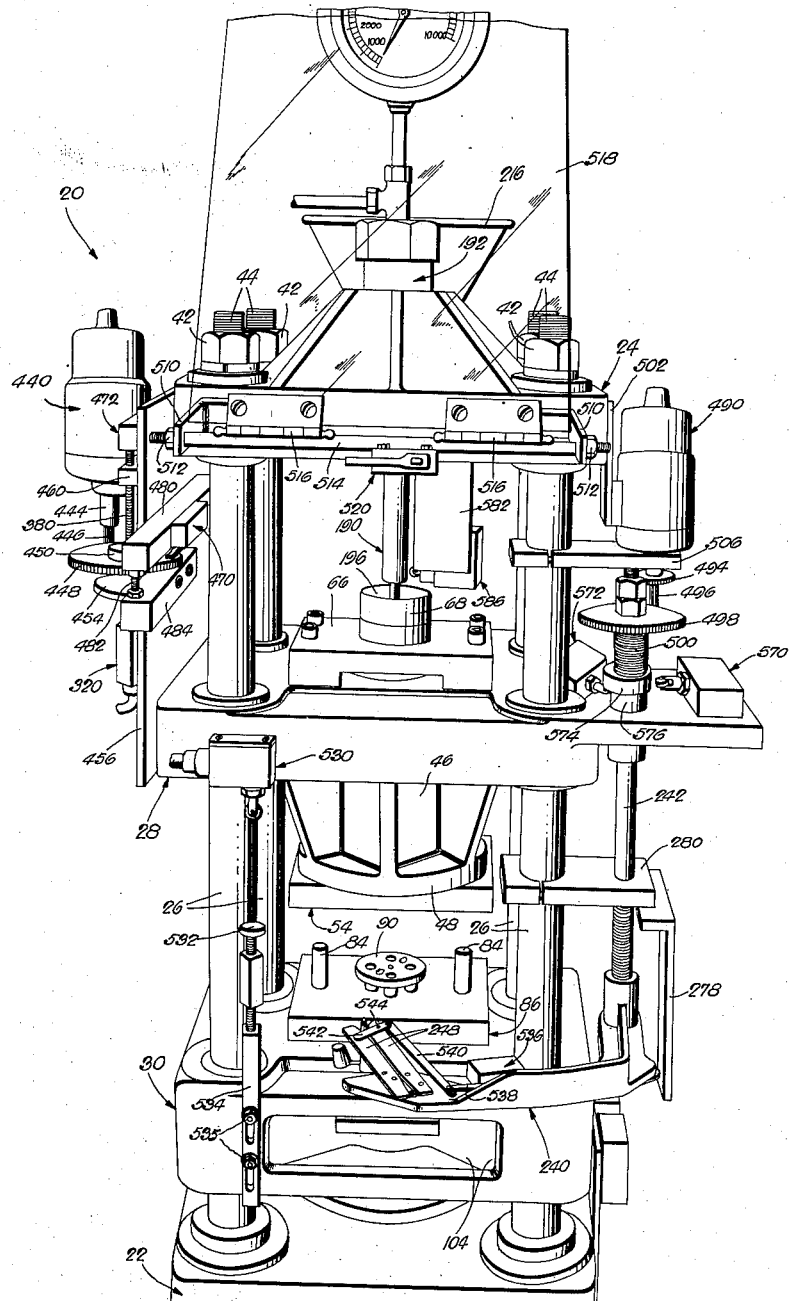
Fig. 1 is a fragmentary perspective view of apparatus embodying the present invention, the apparatus being viewed from the front thereof.

Figs. 4 and 5 together are an enlarged longitudinal section through the apparatus, taken substantially on the line 4,5—4,5 of Fig. 3;

Fig. 4a is a fragmentary section similar to Fig. 4, but showing the mold open;

Fig. 6 is a fragmentary side elevation, partly in section, of certain controls of the apparatus;

Figs. 7 and 8 are views similar to Fig. 6, showing the same controls in different positions of operation, however;

Fig. 9 illustrates, in perspective, the disassembled parts of equipment used for the ejection of a molded product from the apparatus;

Figs. 10, 11 and 12 are plan views of the same ejection equipment in different operating positions;

Fig. 13 diagrammatically illustrates the hydraulic operating devices and controls of the present apparatus, and their lines of communication; and Figs. 14 and 15 together illustrate diagrammatically the electrical operating devices and controls of the present apparatus.

Referring to the drawings, and more particularly to Figs. 1 to 5 thereof, the reference numeral 20 designates a thermo-plastic injection molding apparatus, comprising a base frame 22, a top frame 24, a plurality of posts 26 which are erected on the base frame 22 and support the top frame 24, an upper platen 28 which is mounted on the posts 26, and a lower platen 30 which is guided on the posts 26 for reciprocation to and from the upper platen 28. The base frame 22 is preferably a casting having bosses 32 in which the upright posts 26 are mounted as at 34 (Fig. 4). The top frame 24, which may also be a casting, is seated on annular shoulders 40 on the posts 26, respectively, and is firmly secured thereto by nuts 42 which are threaded over the adjacent shanks 44 of these posts (Fig. 5). The upper, fixed platen 28, which is preferably also a casting, has a rib-reinforced hollow skirt 46 that terminates in a mounting flange 48. The lower, movable platen 30 is provided with bushed bores 50 through which the posts 26, respectively, extend with a sliding fit.

Mounted on the flange 48 of the upper platen 28, as by screws 52, for instance (Figs. 2 and 3), is the top mold member 54 which is provided with a central bore 56 for the reception of the reduced shank of a sprue bushing 58 that extends into a locating ring 60 for an injection nozzle 62. The locating ring 60 is secured in any suitable manner to the top surface of the mold member 54, and the injection nozzle 62 is threaded into or otherwise secured to the lower end of an injection cylinder 64 which is firmly suspended from a bracket 66 on the upper platen 28 by means of ring nuts 68 and 70, threadedly received by the upper end of the injection cylinder 64 and firmly drawn against the interposed web 71 of the bracket 66 (Fig. 5). The bracket 66 may be mounted on the upper platen 28 by means of studs 74 and nuts 76, and the injection cylinder 64 is so adjusted in the direction of its axis as to force the rounded end 78 of the injection nozzle 62 into firm engagement with the adjacent, correspondingly rounded end of the sprue bushing 58 (Fig. 4). Axial adjustment of the injection cylinder 64 is accomplished by turning the ring nuts 68, 70 relative to the injection cylinder 64 which is held non-rotatable by being splined to the bracket 66 as at 80 (Fig. 5).

Seated on the top surface of the lower platen 30, and located thereon by leader pins 84, is the bottom mold member 86 (Figs. 4 and 4a). The top mold member 54 is provided in its bottom face with a recess 88 in which is received a stripper plate 90 when the mold 54, 86 is closed (Fig. 4a). On opening the mold, by lowering the bottom mold member 86 in a manner hereinafter described, the stripper plate 90 will descend with the bottom mold member 86 through part of the opening stroke of the latter, i. e., until the stripper plate 90 becomes seated on stop pins 92 which pass through the bottom mold member 86 and are carried by a plate 94 that rests against the head 96 of a spindle 98, threadedly received in a central post 100 in a "mold" cylinder 102 (Fig. 4). The elevation of the stripper plate 90 above the completely retracted bottom mold member 86 may be adjusted by turning the spindle 98 in the proper direction, the lower platen 30 being to this end provided with a suitable opening 104 (Figs. 1 and 2) for ready access to the central cavity 106 into which the headed spindle 98 projects (Fig. 4). The stripper plate 90 is guided into either one of the positions shown in Figs. 4 and 4a by depending pins 110 thereon which are slidably received in bores 112, respectively, in the bottom mold member 86.

Figure 2:
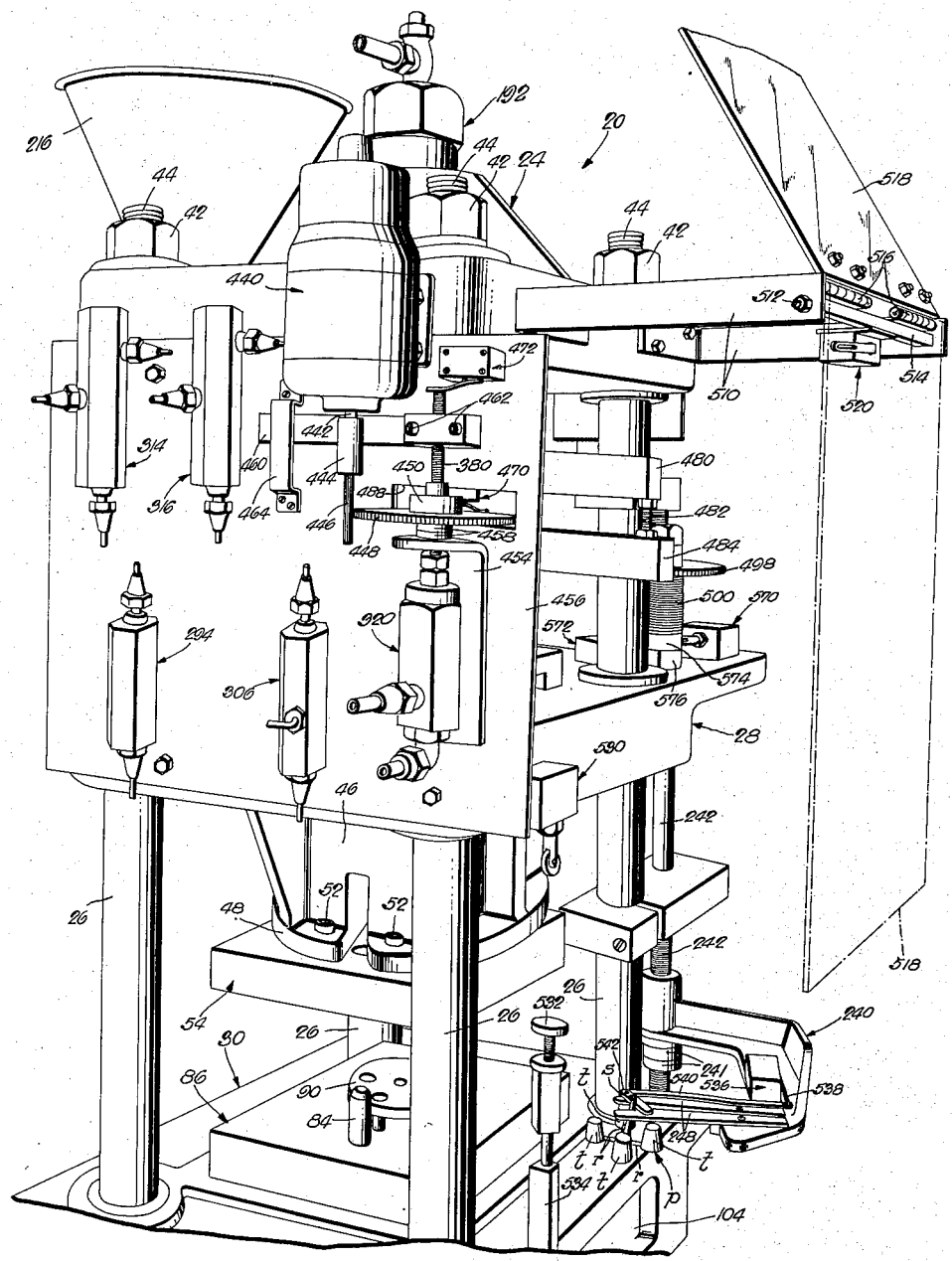

The bottom mold member 86 is provided with a conventional sprue puller 114 that may have an enlarged head for its threaded reception in a tapped bore 116 in the bottom mold member. The stripper plate 90 is provided with a central bore 118 for the reception of the cylinder shank 120 of the sprue puller 114 when the mold 54, 86 is closed (Fig. 4a). The top mold member 54 is provided in its recessed bottom face with one or more mold cavities 126 which communicate with the passage 128 in the sprue bushing 58 through relatively shallow runner grooves 130, respectively. Suitably carried by the bottom mold member 86 may be cores 132 for the mold cavities 126, respectively, in the top mold member 54. In the present instance, the mold cavities 126 and respective cores 132 define, in the closed condition of the mold, thimbles t, respectively (Fig. 2). The stripper plate 90 is provided with openings 134 for the reception of the cylindrical shanks 136 of the cores 132, respectively, when the mold 54, 86 is closed. The leader pins 84 enter preferably bushed bores 140 in the top mold member 54 when the bottom mold member 86 is closed thereagainst, thereby guiding the latter into accurate closing relation with the top mold member 54. Movement of the bottom mold member 86 on the lower platen 30 into its open and closed positions is accomplished by a double-acting "mold" plunger 142 which is slidable in the previously mentioned mold cylinder 102. The mold cylinder 102 comprises end members 144 and 146, respectively, and a cylindrical shell 148 which forms the side wall of the cylinder. The end member 144 may conveniently be bolted at 150 to the base frame 22 (Fig. 4), and the cylinder shell 148 may be threadedly received with its top end in the end member 144. The other end member 146 may be threaded over the bottom end of the cylinder shell 148. The post 100 is mounted on the end member 146 by a nut 152 which is threadedly received by the reduced shank 154 of the post 100. Interposed between the cylinder shell 148 and the end member 146 is a self-sealing packing ring 156 to prevent the escape of fluid under pressure from the bottom end of the mold cylinder 102. To prevent the escape of fluid under pressure from the top end of the mold cylinder 102, there is interposed between the cylinder shell 148 and the end member 144 a packing ring 160 which is preferably held compressed by a washer 162. The mold plunger 142 comprises a hollow rod 164 through which the post 100 extends with a relatively loose fit. The glands of the mold plunger 142 are formed by packing rings 166 and 168, respectively, which in the present instance are L-shaped in cross section (Figs. 4 and 4a) and flanked by opposite ring members 170 and 172. The packing rings 166 and 168 are firmly clamped to an interposed spacer 174 by the ring members 170 and 172, of which the ring member 172 is threaded over the reduced end 178 of the plunger rod 164 to hold the parts 168, 174, 166 and 170 in firm engagement with each other and with an annular shoulder 176 on the plunger rod 164. Escape of fluid under pressure from the bottom end of the mold cylinder 102 through whatever gap there may be between the plunger rod 164 and post 100, is prevented by a packing ring 180 which embraces the post 100 and is firmly clamped to the ring member 172 by a ring nut 182 that is threaded into the ring member 172. The plunger rod 164 has a reduced top end 184 which is preferably threadedly received in a steel bushing 186 in the lower platen 30.

Slidable into and from the injection cylinder 64 is a double-acting injection plunger 190 (Fig. 5) which is slidable in an operating cylinder 192, suitably provided in the top frame 24 of the apparatus (Figs. 5 and 13). The injection plunger 190 is in its most retracted or uppermost position completely withdrawn from the bore 194 in the injection cylinder 64 so as to admit into the latter a charge of thermo-plastic material in solid, preferably granular form previously deposited in a receptacle 196, formed by an extension of the previously described ring nut 68. A plastic charge thus admitted into the injection cylinder 64 will gravitate to the "heating" chamber 198 in the latter. Interposed in the heating chamber 198 of the injection cylinder 64 is a conventional torpedo 200 which is provided with a plurality of ducts 202 through which the molten plastic charge is forced by the plunger 190 after it has been heated to proper molding temperature. Heat is applied to the injection cylinder 64 in the vicinity of the heating chamber 198 therein by preferably several electric heater bands or elements 204 and 206 (Figs. 4 and 5).

Plastic charges for successive molding cycles of the apparatus are supplied to the container 196 through a conduit 208 (Figs. 3 and 3A) at the discharge end 210 of a cylinder 212 in which a rotary feed screw 214 propels solid plastic material from a supply hopper 216 to the discharge end 210 of the cylinder 212. The cylinder 212 may suitably be mounted on the top frame 24 of the apparatus through intermediation of a bracket 218 (Fig. 3A). The feed screw 214 may be coupled to, and driven by, an electric "feed" motor 220 (Figs. 3 and 3A) that may suitably be mounted at 222 on a mounting plate 224 on the cylinder 212.

The apparatus so far described operates in the following manner. Assuming that the mold 54, 86 is open (Fig. 4) and that there is a charge of molten plastic at proper molding temperature present in the heating chamber 198 and discharge nozzle 62, fluid under pressure will then be admitted, as hereinafter described in detail, to the bottom end of the mold cylinder 102 in order to cause ascent of the bottom mold member 86 for closing the mold. After an initial part of the closing stroke of the bottom mold member 86, the stripper plate 90 will become seated on the latter and carried thereby toward and into the recess 88 in the top mold member 54 (Fig. 4a). Simultaneously with the admission of fluid under pressure into the bottom end of the mold cylinder 102, fluid under the same pressure is admitted into the top end of the actuating cylinder 192 (Figs. 5 and 13), resulting in descent of the injection plunger 190. So far, the fluid applied to the cylinders 192 and 102, while under sufficient pressure to close the mold and to lower the injection plunger 190 to some extent, is under insufficient pressure to lower the injection plunger into its lowermost position for forcing a plastic charge from the heating chamber 198 and discharge nozzle 62 into the closed mold. It is at this time that fluid under higher pressure is, as hereinafter described in detail, admitted simultaneously into the top and bottom ends of the cylinders 192 and 102, respectively, in order to hold the mold securely closed and to force the injection plunger 190 into its lowermost position (Fig. 5) for the injection of a plastic charge into the mold.

Fluid under the referred higher pressure will be admitted to the top and bottom ends of the cylinders 192 and 102, respectively, for some time, i. e. at least until the injected plastic charge in the mold has sufficiently solidified to permit the safe ejection of the molded product from the mold. The top and bottom ends of the cylinders 192 and 102, respectively, are then permitted to exhaust and fluid under the initially applied low pressure is, as hereinafter described in detail, admitted simultaneously to the bottom and top ends of the same cylinders 192 and 102, respectively, in order to effect the retraction of the injection plunger 190 into its uppermost position and the descent of the bottom mold member 144 into its open position. The molded product p (Fig. 2), will, during an initial part of the opening stroke of the bottom mold member 86, follow the latter by virtue of the anchorage of the molded product on the sprue puller 114, and the sprue s of the product will then be torn from the remaining plastic in the discharge nozzle 62 substantially at the restricted end 230 of the passage 232 therethrough. When in the continued course of the opening stroke of the bottom mold member 86 the stripper plate 90 comes to rest against the stop pins 92, the sprue puller 114 will be drawn from the sprue of the molded product, and the cores 132 will be retracted from the latter. The molded product then merely lies on, and is not otherwise bound to, the stripper plate 90 during the remaining descent of the bottom mold member 86 into its lowermost position.

For the removal of a molded product p from the mold, there is provided an ejector arm 240 (Figs. 1, 2 and 9 to 12) which is freely slidable on a spindle 242 and splined thereto as at 244 so as to be turnable therewith. The ejector arm 240 rests on nut elements 241 on the threaded spindle 242 (Figs. 2 and 3), and is thus adjustable in its position axially of the spindle 242. Pivoted at 246 on the ejector arm 240 are two companion jaws 248 having confronting, preferably serrated edges 250 with which to grip a molded product p at the sprue s thereof in a manner described hereinafter. The jaw 248' is pivotally connected with a bar 252 by a pin 254 which extends through an elongated slot 256 in the ejector arm 240. The bar 252 is guided for linear movement on the bottom side of the ejector arm 240 by pins or studs 258 which extend through elongated slots 260 in the bar 252. The jaw 248'' is normally urged into the closed position shown in Figs. 9 and 10 by means of a tension spring 262 which is anchored with one end on a pin 264 on the arm 240, and with the other end on a pin 266 that depends from the jaw 248'' and extends through an elongated slot 268 in the arm 240. When the jaw 248'' is permitted to spring-close, the companion jaw 248' is also urged into closed position by the pin 266 which is drawn by the spring 262 against the adjacent edge 270 of the bar 252 and shifts the latter in the direction of the arrow 272 in Fig. 10 until both jaws 248 are closed.

As previously mentioned, the mold 54, 86 is, by way of example, adapted for molding thimbles t (Fig. 2) of which a number (four in the present instance) are connected by conventional runners r with the sprue s of the molded product. In operation, the ejector arm 240 is, in a manner hereinafter described, swung from the retracted position shown in Figs. 1, 2 and 10 inwardly of the mold 54, 86 at such time during the opening stroke of the bottom mold member 86 that the jaws 248 will, at the end of the inward swing of the arm 240, grip the sprue s of the molded product p (Fig. 11) substantially at the time when the stripper plate 90 has come to rest on the stop pins 92, but before the sprue puller 114 has been retracted from the molded product. Gripping of the sprue s by the jaws 248 of the ejector arm is thus assured. After the jaws 248 have gripped the sprue s of the molded product, the ejector arm 240 will, as hereinafter described more fully, be swung outwardly when during continued descent of the bottom mold member 86 the sprue puller 114 and the cores 132 have been retracted from the molded product on the stripper plate 90. Thus, the molded product p is, at the time of the outward swing of the ejector arm 240, free to move with the jaws 248 from the stripper plate 90. It will be observed from Figs. 10 and 11 that the end 276 of the bar 252 extends in the closed as well as sprue-gripping positions of the jaws 248 beyond the arm 240, and strikes against a stop plate 278 at the end of the outward swing of the arm 240 (Fig. 12). The stop plate 278 may be secured in any suitable manner to a bracket 280, which may be clamped to, or otherwise mounted on, one of the upright posts 26 (Fig. 1). Slight continued outward swinging motion of the arm 240 after the bar 252 strikes the stop plate 278 will, through intermediation of the pins 266 and 254, result in opening of the jaws 248 beyond their gripping position (Fig. 12), releasing thereby the sprue s of the molded product p and permitting the latter to gravitate into any suitable receptacle (not shown).

Reference is now had to Fig. 13, which illustrates diagrammatically the hydraulic operating and control devices of the apparatus and their lines of communication. Thus, there is provided a reservoir 286 that holds a supply of any suitable operating fluid F, such as oil, for instance. Communicating with the fluid supply in the reservoir 286 are preferably a large-capacity low-pressure pump 288 and a small-capacity high-pressure pump 290. Communicating with the pump 288 through a conduit 292 is a "medium-pressure" valve 294 which also communicates through conduit 296 with a return or exhaust conduit R that leads into the reservoir 286. Assuming that the low pressure of the fluid previously mentioned for closing the mold 54, 86 be, by way of example, in the neighborhood of 100 pounds per square inch, the spring 298 in the medium-pressure valve may then be calibrated to keep the valve element 300 closed unless the pressure of the fluid from the pump 288 exceeds 200 pounds per square inch, for instance. Branching from the conduit 292 is another conduit 302 which leads to a cross connection 304. Interposed in the conduit 302 is a conventional check valve 306 which permits the flow of fluid under pressure through the valve in the direction of the arrow 308, but blocks the flow of fluid therethrough in the opposite direction. Also leading to the cross connection 304 is a direct conduit 310 from the high-pressure pump 290. Leading from the cross connection 304 is a conduit 312 for the passage of fluid under pressure to a "mold-closing" valve 314 and a "mold-opening" valve 316. Leading from the cross connection 304 is another conduit 318 for the passage of fluid under pressure to a "motor" valve 320. Communicating with chambers 322 and 324 in the "mold-closing" valve 314 are conduits 326 and 328, respectively, which lead to the return conduit R and to a conduit 330, respectively, of which the latter is in communication with the top and bottom ends of the actuating cylinder 192 and mold cylinder 102, respectively. Conduit 312 is in permanent communication with a chamber 332 in the "mold-closing" valve 314. Leading from the chamber 332 in the "mold-closing" valve 314 is a conduit 334 which is in communication with the "mold-opening" valve 316. Slidable in the chamber 332 in the valve 314 is a spring-urged plunger 336 which normally urges a valve element 338 into the position shown in Fig. 13 in which it intercepts communication between the chambers 322 and 324 and provides communication between the chambers 324 and 332. Slidable in the chamber 322 in the valve 314 is a plunger 340 which, on subjection at the rear end 342 of the valve to fluid under pressure, will shift the valve element 338 into engagement with the valve seat 334, thereby intercepting communication between the chambers 332 and 324 and providing communication between the chambers 324 and 322.

The mold-opening valve 316 is provided with chambers 346 and 348. The chamber 346 is in permanent communication with the conduit 334, and the chamber 348 is in permanent communication with the bottom and top ends of the actuating cylinder 192 and mold cylinder 102, respectively, through a conduit 350. Valve 316 is provided with a spring-urged plunger 352 which normally urges a valve element 354 into the closed position shown in Fig. 13, in which it intercepts communication between the chamber 346 and 348. Valve 316 is provided with a further chamber 356 which is in permanent communication with the return conduit R. Slidable in the chamber 356 is a plunger 358 which, on subjection at the rear end of the valve to fluid under pressure, forces a valve element 362 against a seat 364, thereby intercepting communication between the chambers 348 and 356. The valve element 362 will, on movement into engagement with its seat 364, advance a plunger 366 in the chamber 348 to a position in which the same disengages the valve element 354 from its seat 368 against the tendency of the spring-urged plunger 352 to retain it on its seat. Thus, in the respective positions of the valve elements 354 and 362 in the valve 316 shown in Fig. 13, communication between the chambers 346 and 348 is intercepted by the valve element 354, while communication between the chambers 348 and 356 is provided by the valve element 362. Conversely, when the valve elments 362 and 354 are forced into and from engagement with their respective seats 364 and 368, communication between the chambers 346 and 348 is provided by the unseated valve element 354, while communication between the chambers 348 and 356 is intercepted by the seated valve element 362.

The motor valve 320, which is illustrated diagrammatically in Fig. 13 and in structural detail in Fig. 6, comprises a casing 370 having a chamber 372 which is closed at one end by a plug 374, having a passage 376 with a valve seat 378. Adapted for closure on the seat 378 is a needle-type valve element 380 which is axially slidable in a shell 382, threadedly received in the opposite end of the valve casing 370. The valve 380 is raised from, and lowered onto, its seat 378 by power means described hereinafter and, when resting on its seat 378, is forced against the latter by the valve-closing pressure of a calibrated compression spring 384. The valve-closing pressure may be regulated by adjusting the shell 382 in the valve casing 370. The conduit 318 is in permanent communication with the passage 376 in the plug 374, and the chamber 372 is in permanent communication with a conduit 386 that leads to a "solenoid" valve 388. Branching from the conduit 318 is a conduit 390 which leads to a relief or "safety" valve 392 (Fig. 13). The relief or safety valve 392 permits the flow of fluid under pressure therethrough in the direction of the arrow 394, but locks the flow of fluid therethrough in the opposite direction. The chamber 396 in the relief or safety valve 392 communicates through a conduit 398 with the return conduit R. The relief or safety valve 392 serves as a bypass for fluid from the system into the return conduit R when the fluid under the previously mentioned high pressure reaches, by any accidental reason whatsoever, a predetermined safe maximum pressure. Thus, assuming that the predetermined high pressure of the fluid in the system be, way of example, 4000 pounds per square inch, as determined by the valve-closing pressure of the spring 384 in the motor valve 320, and the mentioned safe minimum pressure be 8000 pounds per square inch, the valve-closing spring 400 in the relief or safety valve 392 is accordingly calibrated to permit opening of the valve at a pressure exceeding 800 pounds per square inch.

The solenoid valve 388 is provided with chambers 402, 404 and 406. Conduit 386 is in permanent communication with the chamber 402. The chamber 406 is in permanent communication with the return conduit R through a conduit 408, while the chamber 404 is in permanent communication with the rear ends of the valves 314 and 316 through a conduit 410. Slidable in the chamber 406 of the solenoid valve 388 is a plunger 412, having a rearwardly extending shank 414 that serves as a core for a solenoid having a winding W. A spring 416 may act on the plunger shank 414 to urge the plunger 412 into the retracted position shown in Fig. 13, in which the same permits a valve element 418 to be seated on a seat 417 to intercept communication between the chambers 404 and 406, and provide communication between the chambers 402 and 404. Conversely, on energization of the solenoid winding W, the plunger 412 is advanced into a position in which it forces the valve element 418 into engagement with a valve seat 420, thereby intercepting communication between the chambers 402 and 404 and providing communication between the chambers 404 and 406.

Communicating with the solenoid valve 388 through a conduit 422 is a "low-pressure" relief or safety valve 424 which is, in turn, in permanent communication with the return conduit R through a conduit 426. The low-pressure relief or safety valve 424 is provided for the purpose of bypassing fluid from the system directly into the return conduit R when, on the application in the system of fluid under the previously mentioned low pressure, the latter should exceed a predetermined maximum low pressure. Thus, assuming that the desired maximum low pressure of the fluid should not exceed 100 pounds per square inch, for instance, the valve-closing spring 428 of the low-pressure relief or safety valve 424 is accordingly calibrated to permit opening of the valve under a fluid pressure in excess of 100 pounds per square inch.

It may be stated in advance that the pumps 288 and 290 are power-driven during each operating cycle of the apparatus and also between consecutive operating cycles thereof, if the controls are set for automatic repeat performance of the apparatus. Under the same control conditions of the apparatus, the motor valve 320 is open at all times, except during the application of fluid under high pressure in the apparatus, in each automatic operating cycle thereof, as will be described more fully hereinafter. Under the same control conditions of the apparatus, the solenoid winding W is de-energized at all times, except during the closure of the mold in each operating cycle of the apparatus.

Assuming now that in an automatic operating cycle of the apparatus the time has arrived for opening the mold, the motor valve 320 is then opened and the solenoid winding W de-energized in a manner described hereinafter, while the pumps 288 and 290 keep running.

Fluid from both pumps 288 and 290 passes then through the conduits 302 and 310, respectively, to the cross connection 304, from where the fluid passes through conduit 318, motor valve 320 and conduit 386 to the chamber 402 of the solenoid valve 388. The solenoid winding W being then de-energized, the fluid under pressure is permitted to pass from the chamber 402 to the chamber 404 in the solenoid valve 388 and through the conduit 410 to the rear ends of the valves 314 and 316. Admission of fluid under low pressure into the rear end of the valve 314 will result, as explained, in closure of the valve element 338 on its seat 344 and according interception of communication between the chambers 332 and 324, and simultaneous establishment of communication between the chambers 324 and 322. Communication at that time between the chambers 324 and 322 permits the exhaust of the top and bottom ends of the actuating cylinder 192 and mold cylinder 102, respectively, by way of the conduits 330 and 328, valve 314, and conduit 326 which leads to the return conduit R. Fluid under the same low pressure then also admitted into the rear end of the valve 316 results, as explained, in interception of communication between the chambers 348 and 356 and in the establishment of communication between the chambers 346 and 348. As soon as the valves 314 and 316 are shifted, as above described, by the admission of fluid under low pressure into their respective rear ends, fluid under the same low pressure also passes from the cross connection 304 through conduit 312, chamber 332 of valve 314, conduit 334, the then communicating chambers 346 and 348 of valve 316 and conduit 350, to the bottom and top ends of the actuating cylinder 192 and mold cylinder 102, respectively, with the result that the injection plunger 190 is returned to its most retracted or uppermost position, and the bottom mold member 86 is returned to its open position. Thereafter, and until the mold is again closed in the following operating cycle of the apparatus, the output of the pumps 288 and 290 is bypassed through the low-pressure relief or safety valve 424 and return conduit R into the reservoir 286.

To close the mold in the following operating cycle of the apparatus, the solenoid winding W is energized in a manner to be described, whereby the valve element 418 of the solenoid valve 388 is forced into engagement with its seat 420 (Fig. 13), blocking thereby the passage of fluid under low pressure from conduit 386 through conduit 410 to the valves 314 and 316, and instead providing for the exhaust of the rear ends of these valves by way of conduit 410, the then communicating chambers 404 and 406 in the solenoid valve 388, and the conduit 408 which leads to the return conduit R. Simultaneously with the exhaust of the rear ends of the valves 314 and 316, fluid under low pressure will pass from the cross connection 304 through the conduit 312, the then communicating chambers 332 and 324 of the "mold-closing" valve 314, and the conduits 328 and 330, to the top and bottom ends of the actuating cylinder 192 and mold cylinder 102, respectively, with the result that the injection plunger 190 will be forced through the greater part of its injection stroke without forcing molten plastic from the discharge nozzle 62, and the bottom mold member 86 will be raised into closing relation with the top mold member 54. Simultaneously with the admission of fluid under low pressure into the top and bottom ends of the cylinders 192 and 102, respectively, their opposite ends are permitted to exhaust by way of the conduit 350, valve 316 and return conduit R.

Immediately on closure of the mold 54, 86 in each operating cycle of the apparatus, the motor valve 320 is closed as more fully described hereinafter, interrupting thereby the flow of fluid through the motor valve. With the solenoid winding W still energized, the bottom and top ends of the cylinders 192 and 102 remain in exhaust communication with the return conduit R. Closure of the motor valve 320 then leaves, for the sole immediate passage of fluid under pressure from the cross connection 304, the conduit 312, the communicating chambers 332 and 324 of the "mold-closing" valve 314, the conduits 328 and 330, and the top and bottom ends of the cylinders 192 and 102, respectively, with the result that the output of the high pressure pump 290 will soon increase the pressure of the fluid in the system to the mentioned high pressure which holds the mold 54, 86 safely closed and imparts to the injection plunger 190 its final movement to the end of its injection stroke during which it will force a molten plastic charge from the discharge nozzle 62 into the closed mold. When the injection plunger 190 reaches its lowermost position, the output of the high pressure pump 290 is balanced by the valve-closing pressure of the valve element 380, and the pressure in the system reaches a constant predetermined value. While the fluid in the system is under high pressure, fluid from the low pressure pump 288 is obviously under insufficient pressure to open the check valve 306 and pass into the system, instead the fluid under low pressure will pass through the "medium-pressure" valve 294 into the return conduit R. Fluid under high pressure is retained in the system for a predetermined time period during which the injected plastic charge in the closed mold will be permitted to solidify to an extent where the molded product may, on subsequent opening of the mold, be safely removed therefrom. The time period during which the fluid in the system is under high pressure is governed by certain controls described hereinafter.

At the end of the referred high pressure time interval in each operating cycle of the apparatus, opening of the motor valve 320 relieves immediately the high pressure through conduit 386 and low pressure relief or safety valve 424. As soon as the motor valve 320 is completely opened, the solenoid winding W is de-energized, as more fully described hereinafter. De-energization of the solenoid accordingly results in immediate admission of fluid under low pressure through conduit 386, the then communicating chambers 402 and 404 of the solenoid valve 388 and the conduit 410, to the rear ends of the valves 314 and 316, permitting thereby the exhaust of the top and bottom ends of the cylinders 192 and 102, respectively, by way of the conduits 330 and 328, the then communicating chambers 324 and 322 in the "mold-closing" valve 314, and the conduit 326 which is in permanent communication with the return conduit R. Simultaneously with the exhaust of the top and bottom ends of the cylinders 192 and 102, respectively, fluid under low pressure from both pumps 288 and 290 is also admitted to the bottom and top ends of the same cylinders 192 and 102, respectively, by way of the cross connection 304, conduit 312, chamber 332 in valve 314, conduit 334, the then communicating chambers 346 and 348 in valve 316, and the conduit 350, with the result that the mold 54, 86 will be opened and the injection plunger 190 will be retracted to its uppermost position. Unless the apparatus is then stopped at the end of the present operating cycle, either by manual or automatic controls to be described, the pumps 288 and 290 will continue to operate and their output will be by-passed through the "low-pressure relief or safety" valve 424 into the return conduit R, until the mold 54, 86 is again closed in the next operating cycle of the apparatus.

Reference is now had to Figs. 1, 2, 6, 7 and 8, which show the power means for opening and closing the motor valve 320. This means comprises a "valve" motor 440 to the shaft 442 of which is coupled at 444 a pinion 446 that is in permanent mesh with a gear disk 448, threaded with its hub 450 over a spindle-like extension of the valve element 380 in the motor valve 320. The motor 440 may suitably be mounted on the top frame 24 of the apparatus, and the motor valve 320 may, through intermediation of a bracket 454, be suitably secured to a mounted panel 456 on the top frame 24 and upper platen 28. The gear disk 448 normally rests, in the open position of the motor valve 320 (Fig. 6), on a thrust bearing 458 on the bracket 454. The valve element 380 of the motor valve 320 is held against rotation in either direction by an arm 460 which may be clamped or otherwise secured at 462 to the valve element 380, and a metal strap 464 on the panel 456 which confines the arm 460 into close proximity to the panel, yet permits movement of the arm 460 with the valve element 380 into the open and closed positions of the latter. The valve motor 440 is of the reversible type, and its circuit for causing closure of the motor valve 320 is closed, as hereinafter described, at the proper time in each operating cycle of the apparatus when fluid under high pressure is to be applied to the hydraulic system thereof. When the valve motor 440 is thus operated, the non-rotatable valve element 380 will, by virtue of its threaded engagement with the gear disk 448, be lowered into engagement with its seat 378 (Fig. 7), whereupon continued operation of the motor 440 in the same direction will cause the gear disk 448 to climb on the valve element 380 until it actuates an "overrun" switch 470 (Fig. 8). Actuation of the switch 470 by the gear disk 448 will, as hereinafter described, effect closure of a reverse circuit of the valve motor 440 for reverse operation of the same. The gear disk 448 will then be driven from the motor 440 in the opposite direction in which to descend on the closed valve element 380 until it becomes reseated on the thrust bearing 458. Thereupon, and during continued operation of the valve motor 440 in reverse direction, the gear disk 448 will retract the valve element 380 into its open position (Fig. 6). On return of the valve element 380 to its open position, it will actuate a "motor limit and solenoid" switch 472 which, on such actuation, will open the mentioned reverse circuit of the valve motor 440, whereupon the latter will come to a stop with the parts 380 and 448 in the position shown in Fig. 6. The switch 472 is suitably mounted on the outer surface of the panel 456, while the switch 470 is carried by an arm 480 which is pivotally mounted on the opposite surface of the panel 456 (Fig. 1). The arm 480 may rest against a set screw 482 in a block 484 on the panel 456. The set screw 482 serves to adjust the vertical position of the switch 470 on the arm 480, to thereby vary the time period in each operating cycle of the apparatus during which the mold 54, 86 is held closed by fluid under high pressure. In order that the gear disk 448 may actuate the switch 470, as described, the former extends through an opening 488 in the panel 456.

The ejector arm 240 is swung into its "in" and "out" positions by an "arm" motor 490 (Figs. 1 and 3), having suitably coupled to its shaft a pinion 492 which is in permanent mesh with a gear 494, having a coaxially extending pinion 496 that is in permanent mesh with another gear 498, mounted on the spindle 242. The spindle 242 is driven at a speed which is considerably reduced from that of the motor 490 by means of a pre-loaded compression spring 500 which acts on the spindle 242 as a clutch, thus enabling the ejector arm 240 to be moved by hand, if necessary, when adjusting its level. The motor 490 may suitably be mounted on a plate 502 (Fig. 3) which, in turn, is mounted at 504 on the top frame 24 of the apparatus. The gear 494 and pinion 496 may suitably be journalled in a bracket arm 506, clamped to, or otherwise mounted on, one of the posts 26.

As best shown in Figs. 1 and 2, there are mounted on the top frame 24 of the apparatus two spaced bracket arms 510 to the forward ends of which is suitably secured, as at 512, a rod 514. Hinged at 516 to the rod 514 is a guard 518 of any suitable transparent, preferably plastic, material. The guard 518, which may be swung into the raised position shown in Figs. 1 and 3, is normally swung into the dot-and-dash line position shown in Fig. 2 in which it extends substantially to the level of the stationary top mold member 54 in order to protect an operator from flying plastic which, due to overheating or for some other reason, may be blown from the closed mold or along the injection plunger 190. The swingable guard 518 performs the further function of permitting operation of the apparatus only when it assumes the protective dot-and-dash line position shown in Fig. 2. To this end, there is suitably mounted on the rod 514 a "guard" switch 520 which, as hereinafter described, permits operation of the apparatus only when actuated by the guard 518 in its protective position. The guard 518 thus also protects an operator from getting his hands caught between the mold members 54 and 86, for the latter are practically inaccessible to an operator in his or her normal position in front of the apparatus, unless the guard 518 is swung into the raised position shown in Figs. 1 and 3.

Included among the electrical operating and control devices of the apparatus are several other prominent switches which will be referred to presently. Thus, mounted on the upper platen 28 in any suitable manner is a normally open "mold" switch 530 (Figs. 1 and 2), which is closed, when the mold 54, 86 is closed, by means of an adjustable screw 532 on a bar 534, adjustably mounted at 535 on the lower platen 30.

Suitably mounted on the ejector arm 240 is a normally open "sprue" switch 536 which is closed when the sprue s of a molded product p is gripped between the jaws 248 on the ejector arm 240 (Fig. 11). To this end, the actuating arm 538 of the switch 536 is connected by a link 540 with an arm 542 which is pivoted at 544 on one of the jaws 248 (Fig. 10). When the ejector arm 240 is swung from its "out" position inwardly between the partially open mold 54, 86 for gripping the sprue s of a molded product between the jaws 248, as hereinbefore described, the arm 542 is turned by the sprue s into the position shown in Fig. 11, in which the switch 536 is closed through intermediation of the link 540. The switch 536 remains closed until the sprue s is released from the jaws 248, as will be readily understood.

Suitably mounted on brackets 548 and 550 on the base frame 22 of the apparatus are switches 552 and 554, respectively, hereinafter referred to as "mold-in" and "mold-out" switches, respectively (Fig. 3). Mounted at 556 on the lower platen 30 is a bracket 558, carrying spindles 560 and 562 which are threadedly received by blocks 564 and 566, respectively, that are slidable on the bracket 558 and thereby prevented from turning relative to their respective spindles 560, 562. The block 564 suitably carries a cam-like element 568 which is adapted to actuate the switch 552 when the bottom mold member 86 is substantially retracted from the top mold member 54, but is still above its lowermost position. The block 566 is adapted to actuate the switch 554 when the bottom mold member 86 is in its lowermost position.

Suitably mounted on the upper platen 28 of the apparatus are two switches 570 and 572 (Figs. 1 to 3), hereinafter referred to as "arm-in" and "arm-out" switches respectively. These switches 570 and 572 are actuated by cams 574 and 576, respectively, on the spindle 242.

Suitably mounted on the brackets 580 and 582, which suitably depend from the top frame 24 of the apparatus, are a "plunger" switch 584 and a "feed" switch 586, respectively, both of which are actuated by the injection plunger 190 in a manner hereinafter described.

Reference is now had to the wiring diagram in Figs. 14 and 15 in which the electrical operating and control devices of the apparatus and their connections are diagrammatically illustrated. Shown in the wiring diagram are several control switches not heretofore mentioned. Thus, there are provided a "stop" switch 590 of the push button type, a settable "cycle-alarm" switch 592, a "start" switch 594 of the push button type, a settable "run-jog" switch 596, a settable "arm" switch 598, an "up" switch 600 of the push button type, a "down" switch 602 of the push button type, a settable "pressure" switch 604, an "initial-heating" switch 606 of the push button type, a settable "heat-control" switch 608, a settable "feeding" switch 610, a "manual-feed" switch 612 of the push button type, and a "shoot" switch 614 of the push button type. The apparatus is further provided with a normally closed "thermo" switch 616, preferably of the bi-metallic type, which may be mounted at any convenient place (not shown) on the top mold member 54 where it is in close proximity to the heating chamber 198 in the injection cylinder 64 and subjected to the heat therein. The "thermo" switch 616 will open when the temperature of the molten plastic in the discharge nozzle 62 will exceed a predetermined maximum temperature. The "main" switch of the apparatus is indicated in the wiring diagram by the reference numeral 618. The "main" switch 618 is normally open, and is closed by a "main-switch" relay 620.

In order to start the apparatus from a "cold" state, i. e., after prolonged idleness of the same during which the heater elements 204 and 206 were de-energized, the operator will set the "run-jog" switch 596 to "run" position in which the contacts A2, a2 and B2, b2 are bridged as indicated by dotted lines in the wiring diagram. The operator then momentarily depresses the "start" switch 594, thereby bridging the contacts 624 and 626 thereof and consequently closing a starting circuit of the "main switch" relay 620. This circuit comprises one side L1' of a power line, leads 628 and 630, the momentarily bridged contacts 624 and 626 of the "start" switch 594, a lead 632, relay 620, a lead 634, the normally closed "stop" switch 590, a lead 636, a normally closed "alarm" switch 638 and the other side L2 of the power line. Energization of the "main switch" relay 620, in consequence of the momentary closure of the described starting circuit thereof, results in closure of the auxiliary switches 640, 642, 644 and 646 of the "main" switch 618. One phase of a three-phase current source is permanently connected by a lead 648 with a pump motor (not shown) which drives the pumps 288 and 290. Closure of the auxiliary switches 640 and 642 results in connection by leads 650 and 652, of the other phases of the three-phase current source with the pump motor, causing thereby operation of the latter. Closure of the auxiliary switch 644 results in connection of the permanently available side L1' of the power line with a number of terminals L1 in the apparatus, the terminal L1 nearest the auxiliary switch 644 being accordingly connected with all other terminals L1 by leads (not shown). Closure of the auxiliary switch 646, also in consequence of momentary closure of the described starting circuit of the "main switch" relay 620, results in closure of a holding circuit of the latter relay. This holding circuit comprises the side L1' of the power line, leads 654 and 656, the auxiliary switch 646, a lead 658, the bridged contacts A2, a2 of the "run-jog" switch 596, leads 660 and 662, the "guard" switch 520 (which is closed when guard 518 is lowered), a lead 664, the lead 632, relay 620, lead 634, the normally closed "stop" switch 590, lead 636, the normally closed "alarm" switch 638, and the other side L2 of the power line.

The operator may next set the "heat-control" switch 608 to "automatic" position in which the contacts A2, a2 and B1, b1 are bridged as indicated in dotted lines in the wiring diagram (Fig. 14). All terminals L1 having previously been connected with the side L1' of the power line, the circuits of the heater elements 204 and 206 will be closed immediately on setting the "heat-control" switch 608, as described. These circuits have a rump portion, comprising a terminal L1, leads 666 and 668, the bridged contact B1, b1 of the "heat-control" switch 608, a lead 670, the then closed "thermo" switch 616, and a lead 672 from which branch the heater elements 204 and 206, the latter being connected with the side L2 of the power line. In series connection with the heater element 206 is a variable resistance 674 wherewith to regulate the heat output of the heater element 206. Since the injection plunger 190 is normally in its uppermost position when the apparatus is idle, and the feed screw 214 (Fig. 3A) feeds plastic only when the injection plunger 190 is in its lowermost position in each operating cycle of the apparatus, it stands to reason that normally there is plastic material present in the heating chamber 198 in the injection plunger 64 at the time of a "cold" start of the apparatus. This plastic will be heated in the chamber 198 by the surrounding heater elements 204 and 206 until it becomes molten and acquires proper molding temperature. This requires some time after the "heat-control" switch 608 has been set, as described.

The operator is not compelled to await the melting of the plastic in the injection cylinder 64 before conditioning the apparatus for automatic repeat molding-cycle performance, for instance, but may do so at any time after setting the "heat-control" switch 608, as described. To this end, the operator may set the "cycle-alarm," "arm," "pressure," and "feeding" switches 592, 598, 604 and 610, respectively, so that the contacts A2, a2 and B1, b1 of switch 592, the contacts A2, a2 and B2, b2 of switch 598, the contacts A2, a2 and B2, b2 of switch 604, and the contacts A, a of switch 610 are bridged as indicated by dotted lines in the wiring diagram. However, the conditioning of the apparatus for automatic repeat molding-cycle performance is not completed with the described setting of the switches 592, 598, 604 and 610, but additionally requires momentary depression by the operator of the "initial-heating" switch 606 for momentary connection of the contacts A and B thereof. Momentary depression of the "initial-heating" switch 606 results in closure of a starting circuit of an "initial-heat" relay 676, the function of which is to time the start of the first automatic molding cycle of the apparatus with the attainment by the plastic in the injection cylinder 64 of the proper molding temperature. This starting circuit comprises a terminal L1, the leads 666 and 668, the bridged contacts B1, b1 of the "heat-control" switch 608, the lead 670, the "thermo" switch 616, the lead 672, leads 678 and 680, the bridged contacts A2, a2 of the "heat-control" switch 608, a lead 682, the relay 676, a lead 684, the momentarily bridged contacts A, B of the "initial-heating" switch 606 and the side L2 of the power line. Closure of the starting circuit of the "initial-heat" relay 676 and according energization of the latter, results in engagement of the contacts a, b of a switch 686 and disengagement of the normally engaged contacts c, d thereof. Energization of the "initial-heat" relay 676 also causes engagement of the contacts a, b of a switch 688 and disengagement of the normally engaged contacts c, d thereof. Closure of the referred starting circuit of the "initial-heat" relay 676 results in immediate closure of a holding circuit of the latter, which comprises a terminal L1, the leads 666 and 668, the bridged contacts B1, b1 of the "heat-control" switch 608, the lead 670, the "thermo" switch 616, the leads 672, 678 and 680, the bridged contacts A2, a2 of the "heat-control" switch 608, the lead 682, the relay 676, the lead 684, a lead 690, the normally bridged contacts A1, a1 of the "up" switch 600, a lead 692, the then engaged contacts a, b of switch 686, and the side L2 of the power line.

The performance of a molding cycle of the apparatus is contingent upon the energization of a "valve" relay 696 and a "solenoid" relay 698. However, closure of the circuits of these relays 696 and 698 is contingent upon energization of an "arm" relay 700. Assuming that the injection plunger 190 is in its uppermost position and the bottom mold member 86 is in its lowermost position, where they normally should be in the idle condition of the apparatus, the circuit of the "arm" relay 700 is closed immediately on setting the "cycle-alarm" switch 592. This circuit comprises the side L2 of the power line, the normally closed "alarm" switch 638, the lead 636, a lead 702, the "arm" relay 700, leads 704 and 706, the bridged contacts A2, a2 of the switch 592, leads 708 and 710, the "plunger" switch 584 (which is normally closed when the injection plunger 190 is in its uppermost position), a lead 712, the contacts c, d of the "mold-out" switch 554 (which are engaged when the bottom mold member 86 is in its lowermost position), a lead 714, a normally closed switch 716, a lead 718, the contacts a, b of the "motor limit and solenoid" switch 472 (which are engaged when the motor valve 320 is in its open position), and a terminal L1. If the ejector arm 240 is in its "out" position, as it should be, when the circuit of the "arm" relay is closed, there will immediately be closed a starting circuit of the "valve" and "solenoid" relays 696 and 698, respectively. This starting circuit comprises the side L2 of the power line, the normally closed "down" switch 602, leads 720 and 722 across which the relays 696 and 698 are connected in parallel by leads 724 and 726, respectively, a switch 728 (which is then closed by the energized "arm" relay 700), a lead 730, the contacts c, d of the "arm-out" switch 572 (which are engaged when the ejector arm 240 is in the "out" position), leads 732 and 734, the contacts a, b of switch 688 (which are engaged by the energized "initial-heat" relay 676), a lead 736, the lead 658, the closed auxiliary switch 646, the leads 656 and 654, and the other side L1' of the power line. If the ejector arm 240 should, at the time of the energization of the "arm" relay 700, not be in its normal "out" position, the above starting circuit of the "valve" and "solenoid" relays 696 and 698 will not be closed by reason of the fact that the contacts c and d of the "arm-out" switch 572 will then not be engaged. Instead, the contacts a, b of the "arm-out" switch 572 will then be engaged, with the result that an initial "arm-out" circuit of the arm motor 490 is closed in order to turn the spindle 242 in a direction to swing the arm 240 into its "out" position. This initial "arm-out" circuit of the arm motor 490 is, between the common contacts b, c of the "arm-out" switch 572 and the side L1' of the power line at the "main" switch 618, the same as the above-described starting circuit of the relays 696 and 698, and the "arm-out" circuit of the arm motor 490 is completed by way of the then engaged contacts a, b of the "arm-out" switch 572, a lead 740, the arm motor 490, and the other side L2 of the power line. Thus, if the ejector arm 240 is not in its "out" position when the desired circuit of the "arm" relay 700 is closed, closure of the described starting circuit of the "valve" and "solenoid" relays 696 and 698 is delayed until the arm 240 is swung into its "out" position in which it causes engagement of the contacts c, d of the "arm-out" switch 572.

Immediately on closure of the starting circuit of the "valve" and "solenoid" relays 696 and 698, respectively, there is closed a holding circuit of the same relays. This holding circuit comprises the side L2 of the power line, the normally closed "down" switch 602, the leads 720 and 722 across which the relays 696 and 698 are connected in parallel by the leads 724 and 726, respectively, a switch 742 (which is closed by the then energized "valve" relay 696), a lead 744, the "over-run" switch 470 (which is normally closed except when momentarily opened by the gear disk 448 in the middle of each molding cycle), and a terminal L1.

With the holding circuit of the "valve" and "solenoid" relays closed, as described, the apparatus awaits the heating of the plastic charge in the injection cylinder 64 to proper molding temperature before performing any further operation. When the plastic charge in the injection cylinder 64 has reached proper molding temperature, the "thermo" switch 616 will open automatically, opening thereby the circuits of the heater elements 204 and 206, as well as the described holding circuit of the "initial-heat" relay 676. Immediately on interruption of the holding circuit of the "initial-heat" relay 676 and according de-energization of the latter, switch 686 is permitted to return to its normal position shown in the wiring diagram (Fig. 14), with the result that there is closed an "initial" circuit of the solenoid winding W of the solenoid valve 388 (Fig. 13). This initial circuit comprises a terminal L1, a switch 750 (which is then closed by the energized "solenoid" relay 698), a lead 752, the solenoid winding W, a lead 754, the normally engaged contacts c, d of switch 686, and the side L2 of the power line.

Closure of the initial circuit just described of the solenoid winding W results in closure of the mold 54, 86 and initial descent of the injection plunger 190, as has previously been explained in connection with the hydraulic diagram shown in Fig. 13. The "motor" valve 320 is then in its open position. The set screw 532 on the bar 534 (Fig. 1) is so adjusted that it will close the normally open "mold" switch 530 only when the mold 54, 86 closes completely. Hence, the "mold" switch 530 will not be closed if any foreign matter whatever between the mold members 54, 86 prevents their complete closure. Assuming that the mold 54, 86 closes completely and that the "mold" switch 530 is consequently closed, there will be closed a "close" circuit of the "valve" motor 404. This "close" circuit comprises a terminal L1, a normally open switch 758 (which is then closed by the energized "valve" relay 696), leads 760 and 762, the "mold" switch 530, leads 764 and 766, the bridged contacts A2, a2 of the "pressure" switch 604, a lead 768, the "valve" motor 440, and the side L2 of the power line. Closure of this circuit results in operation of the "valve" motor 440 in a direction to effect closure of the motor valve 320 (Fig. 7). Operation of the "valve" motor 440 in the same direction will, after closure of the "motor" valve 320, continue until the normally closed "over-run" switch 470 is opened by the climbing gear disk 448 on the valve element 380 (Fig. 8). When the "over-run" switch 470 is thus opened by the gear disk 448, the described holding circuit of the "valve" and "solenoid" relays 696 and 698 is opened. On according de-energization of the "valve" and "solenoid" relays 696 and 698, respectively, there is closed an "open" circuit of the "valve" motor 440. This "open" circuit comprises the side L2 of the power line, the "valve" motor 440, a lead 770, the normally closed "shoot" switch 614, a lead 772, the contacts e and f of the "motor limit and solenoid" switch 472 (which are engaged when the "motor" valve 320 is closed), a lead 774, a switch 776 (which is then normally closed), and the other side L1' of the power line. On closure of this circuit, the "valve" motor 440 will be operated in the reverse direction, with the result that the gear disk 448 will descend on the valve element 380 from the position shown in Fig. 8 into that shown in Fig. 7, whereupon on continued operation of the "valve" motor 440 in reverse direction the valve element 380 is raised to its open position (Fig. 6) in which it disengages the contacts e, f for the "motor-limit and solenoid" switch 472, opening thereby the above-described "open" circuit of the valve motor 440 which will then stop.

As earlier explained, fluid under high pressure holds the mold 54, 86 closed, as well as lowers the injection plunger 190 into, and then holds the same in, its lowermost position, until the molded product has sufficiently solidified to permit its subsequent safe removal from the mold. The time period during which the mold 54, 86 and the injection plunger 190 are thus subjected to fluid under high pressure is the same as that during which the gear disk 448 is raised from the thrust bearing 458 (Fig. 7) to actuate the "over-run" switch 470 (Fig. 8), and is again returned into seating engagement with the thrust bearing 458 (Fig. 7). Inasmuch as the "valve" motor 440 may operate at constant speed in either direction, it stands to reason that the referred time period varies with the axial travel of the gear disk 448 in opposite directions on the valve element 380. Hence, this time period may be varied by adjusting the vertical position of the "over-run" switch 470, this being accomplished by adjustment of the set screw 482 (Figs. 1 and 2).

On de-energization of the "valve" and "solenoid" relays 696 and 698, respectively, in consequence of the actuation of the "over-run" switch 470 by the gear disk 448 (Fig. 8), the described "initial" circuit of the solenoid winding W is interrupted at the switch 750. However, there has previously been closed a holding circuit of the solenoid winding W, and this circuit remains closed until the valve element 380 re-engages the "motor-limit and solenoid" switch 472 (Fig. 6). This holding circuit comprises a terminal L1, the contacts c, d of the "motor-limit and solenoid" switch 472 (which are engaged when the valve element 380 is retracted therefrom), a lead 780, the lead 752, the solenoid winding W, the lead 754, the engaged contacts c and d of switch 686, and the side L2 of the power line. Thus, the solenoid winding W remains energized until the valve element 380 of the motor valve 320 returns to its open position (Fig. 6). When the solenoid winding W is then de-energized, the top and bottom ends of the actuating cylinder 192 and the mold cylinder 102, respectively, are permitted to exhaust, and fluid under low pressure is admitted to the other ends of the same cylinders for the retraction of the injection plunger 190 into its uppermost position and the retraction of the bottom mold member 86 into its lowermost or open position, all as hereinbefore described in connection with the hydraulic diagram in Fig. 13.

Provisions are made to assure that the ejector arm 240 is in its "out" position during that time period in each molding cycle of the apparatus when its presence between, or its inward swing toward, the mold 54, 86 would interfere with the proper operation of, and possibly cause damage to, the apparatus. To this end, the previously described initial "arm-out" circuit of the "arm" motor 490 is closed until the "initial-heat" relay 676 is de-energized at the end of the plastic melting and pre-heating period. When this initial circuit opens an "arm-out" holding circuit of the "arm" motor 490 is closed and remains closed until after the mold 54, 86 is closed, i. e., until the "valve" and "solenoid" relays 696 and 698 are de-energized by the explained action of the gear disk 448 on the "over-run" switch 470 (Fig. 8). This holding circuit comprises the side L2 of the power line, the "arm" motor 490, the lead 740, the contacts a, b of switch 572 (which are normally engaged when the ejector arm 240 is not in its "out" position), the leads 732 and 734, the lead 760, switch 758 (which is closed when "valve" relay 696 is energized), and a terminal L1. This holding circuit is, of course, closed only when the ejector arm 240 is not in its "out" position, in which event the engaged contacts a, b of the "arm-out" switch 572 effect the closure of this holding circuit.

On partial descent of the bottom mold member 86 from its closed position, the cam element 568 on the lower platen 30 (Fig. 3) closes the normally open "mold-in" switch 552, closing thereby an "arm-in" circuit of the "arm" motor 490. This "arm-in" circuit comprises the side L2 of the power line, the "arm" motor 490, a lead 782, the "arm-in" switch 570 (which is normally closed except when the ejector arm is in its "inner" position), a lead 784, the normally bridged contacts c, d of the "start" switch 594, a lead 786, the bridged contacts B2, b2 of the "run-jog" switch 596, a lead 788, the then closed "mold-in" switch 552, a lead 790, the bridged contacts A2, a2 of the "arm" switch 598, a lead 792, the contacts a, b of the "mold-out" switch 554 (which are normally engaged when the bottom mold member 86 is not in its lowermost position), the lead 714, the normally closed switch 716, the lead 718, the contacts a, b of the "motor-limit and solenoid" switch 472 (which are engaged when the motor valve 320 is open), and a terminal L1. The "mold-in" switch 552 is so coordinated with the cam element 568 on the adjustable block 564 (Fig. 3), that the ejector arm 240 is swung inwardly over the descending bottom mold member 86 at such time that the jaws 248 on the arm 240 grip the sprue s of the molded product p just before the sprue puller 114 is withdrawn therefrom. In this wise the molded product p is still firmly anchored to the stripper plate 90 when the jaws 248 on the ejector arm 240 grip the sprue s.

The following outswing of the ejector arm 240 with the molded product p will not take place until the bottom mold member 86 reaches its lowermost position and the injection plunger 190 reaches its uppermost position, this by virtue of the fact that the following "arm-out" circuit of the "arm" motor 490 includes the contacts c, d of the "mold-out" switch 554 which are engaged only when the bottom mold member 86 is in its lowermost position (Fig. 3), and includes further the "plunger" switch 584 which is closed only when the injection plunger 190 is in its uppermost position. When these switches 554 and 584 are actuated by the bottom mold member 86 in its lowermost position and by the injection plunger 190 in its uppermost position, as above described, there is closed the last-mentioned "arm-out" circuit of the "arm" motor 490, which comprises the side L2 of the power line, the "arm" motor 490, the lead 740, the contacts a, b of the "arm-out" switch 572 (which are engaged when the ejector arm 240 is not in its "out" position), the leads 732 and 734, the "sprue" switch 536 (which is then closed due to the presence of a sprue s in the jaws 248), the lead 710, the "plunger" switch 584, lead 712, the "mold-out" switch 554, the lead 714, the normally closed switch 716, the lead 718, the then engaged contacts a, b of the "motor-limit and solenoid" switch 472, and a terminal L1.

Immediately on closure of the "sprue" switch 536, in consequence of the gripping by the jaws 248 of the sprue s of the molded product in the opening mold, a "re-start" circuit of the "valve" and "solenoid" relays 696 and 698 is conditioned for closure when the ejector arm 240 reaches its "out" position and the injection plunger 190 and bottom mold member 86 reach their uppermost and lowermost positions, respectively. This "re-start" circuit of the "valve" and "solenoid" relays 696 and 698 comprises the side L2 of the power line, the normally closed "down" switch 602, the leads 720 and 722 across which the "valve" and "solenoid" relays 696 and 698 are connected in parallel by the leads 724 and 726, respectively, the switch 728, the lead 730, the contacts c, d of the "arm-out" switch 572, the leads 732 and 734, the "sprue" switch 536, the lead 710, the "plunger" switch 584, the lead 712, the contacts c, d of the "mold-out" switch 554, the lead 714, the normally closed switch 716, the lead 718, the then engaged contacts a, b of the "motor-limit and solenoid" switch 472, and a terminal L1. Thus, in order to close this "re-start" circuit of the "valve" and "solenoid" relays 696 and 698, the injection plunger 190 and the bottom mold member 86 must reach their uppermost and lowermost positions, respectively, in order to close the "plunger" switch 584 and cause engagement of the contacts c, d of the "mold-out" switch 554, respectively, the ejector arm 240 must reach its "out" position in order to cause engagement of the contacts c, d of the "arm-out" switch 572, the "sprue" switch 536 must be closed by the presence of a sprue s between the jaws 248 on the ejector arm 240, and the switch 728 must be closed. The switch 728 is closed on closure of the previously described circuit of the "arm" relay 700 and consequent energization of the latter. This circuit is, for the sake of convenience, again described as comprising the side L2 of the power line, the normally closed "alarm" switch 638, the leads 636 and 702, the "arm" relay 700, the leads 704 and 706, the bridged contacts A2, a2 of the switch 592, the leads 708 and 710, the "plunger" switch 584 (which is normally closed when the injection plunger 190 is in its uppermost position), the lead 712, the contacts c, d of the "mold-out" switch 554 (which are engaged when the bottom mold member 86 is in its lowermost position), the lead 714, the normally closed switch 716, the lead 718, the contacts a, b of the "motor-limit and solenoid" switch 472 (which are engaged when the motor valve 320 is in its open position), and a terminal L1. Thus, as soon as the injection plunger 190 and the bottom mold member 86 reach their respective uppermost and lowermost positions, the circuit just described of the "arm" relay 700 is closed, resulting in closure of switch 728 which is in the "re-start" circuit of the "valve" and "solenoid" relays 696 and 698. The latter circuit will then be closed immediately on arrival of the ejector arm 240 in its "out" position, as will now be readily understood. The ejector arm 240 is, by its own momentum, swung slightly beyond its normal "out" position into the position shown in Fig. 12, in the course of which the bar 252 engages the stop plate 278 while the ejector arm 240 is carried further outwardly, resulting in opening of the jaws 248 and release of the molded product therefrom.

Energization of the "valve" and "solenoid" relays 696 and 698, respectively, in consequence of the closure of the "restart" circuit thereof, causes closure of the switch 742 and according closure of the described holding circuit of the same relays 696 and 698. The "re-start" circuit of the "valve" and "solenoid" relays 696 and 698 is closed only momentarily, the same being interrupted at the "sprue" switch 536 as soon as the molded product is released from the jaws 248. Momentary reenergization of the "valve" and "solenoid" relays 696 and 698, in consequence of the momentary closure of the "re-start" circuit thereof, starts the next automatic molding cycle of the apparatus, which begins with the immediate closure of the mold 54, 86. This is due to the fact that the described "initial" circuit of the solenoid winding W is closed at the switch 750 immediately when the solenoid relay 698 is energized, the contacts c, d of the switch 686 in the same circuit of the solenoid winding W being then normally engaged by virtue of the fact that the "initial-heat" relay 676 is then de-energized.

When the injection plunger 190 is, in the molding cycle just described, in its lowermost position, the normally open "feed" switch 586 is closed, closing thereby the circuit of a "feeding" relay 796. This circuit comprises the side L1' of the power line, the leads 654 and 656, the closed auxiliary switch 646 of the "main" switch 618, the lead 658, the bridged contacts A2, a2 of the "run-jog" switch 596, the lead 660, a lead 798, the "feed" switch 586, a lead 800, the bridged contacts A, a of the "feeding" switch 610, a lead 802, the "feeding" relay 796, a lead 804, a normally closed switch 806, and the other side L2 of the power line. Energization of the "feeding" relay 796, in consequence of the closure of the circuit just described, results in closure of the circuit of the "feed" motor 220. This motor circuit comprises the side L1' of the power line, the leads 654 and 656, the closed auxiliary switch 646 of the "main" switch 618, the lead 658, the bridged contacts A2, a2 of the "run-jog" switch 596, the lead 660, leads 808 and 810, a switch 812 (which is closed on energization of the "feeding" relay 796), leads 814 and 816, the "feed" motor 220, and the other side L2 of the power line. Closure of the referred circuit of the "feeding" relay 796 results in immediate closure of a holding circuit of the latter, which comprises the side L1' of the power line, the leads 654 and 656, the closed auxiliary switch 646 of the main switch 618, the lead 658, the bridged contacts A2, a2 of the "run-jog" switch 596, the lead 660, a lead 808, a switch 813 (which is closed on energization of the "feeding" relay 796), leads 809 and 866, the timer T3 and the other side L2 of the power line. The just described holding circuit of the "feeding" relay is also the operating circuit of the timer T3, which may be of any well known type and may be electrically operated and presettable to energize an enclosed relay (not shown) after a predetermined period of operation of the timer. Operation of the timer T3 during a predetermined feeding time to which the timer is set, will result thereafter in energizing the relay of the timer T3, thereby opening the switch 806 and thus opening the circuit of the "feeding" relay 796. De-energization of the "feeding" relay 796 will then bring about opening of the circuit of the "feed" motor and opening of the circuit of the timer T3. Thus the feed screw 214 (Fig. 3A) will start feeding granular plastic from the supply hopper 216 into the container 196 the moment the injection plunger 190 reaches its lowermost position, and will stop feeding granular plastic after the predetermined feeding time is elapsed.

If the injection plunger 190 should become stuck in its lowermost position after the end of the predetermined feeding time, the timer T3 will remain in operation, an auxiliary operating circuit replacing the normal operating circuit of the timer T3. This auxiliary operating circuit comprises the side L1' of the power line, the leads 654 and 656, the closed auxiliary switch 646 of the "main" switch 618, the lead 658, the bridged contacts A2, a2 of the "run-jog" switch 596, the leads 660 and 798, the "feed" switch 586, the lead 800, the bridged contacts A, a of the "feeding" switch 610, the lead 802, a lead 866, the timer T3 and the other side L2 of the power line. Thus, the relay of the timer T3 will remain energized and the switch 806 will remain opened, keeping open the circuit of the "feeding" relay 796, which will remain de-energized, and the "feed" motor will remain stopped, thus avoiding over-feeding of the supply hopper 216.

The "main" switch 618 remains closed during and between automatic molding cycles of the apparatus, so long as the controls of the latter are set for automatic repeat-cycle performance. To this end, the previously described holding circuit of the "main switch" relay 620 remains closed until the automatic repeat cycle performance of the apparatus is canceled by swinging the guard 518 into the raised position, thus disengaging the contacts of the switch 520 and opening the holding circuit of the main relay.

Each automatic repeat molding cycle is exactly like the above-described molding cycle, starting with the closure of the mold 54, 86. A detailed description of a repeat molding cycle of the apparatus is, therefore, deemed superfluous.

Provisions are also made in the present apparatus for interrupting its operation when, in the course of any automatic molding cycle thereof, the cycle is of excessive duration or will not be concluded, due either to defective performance, or lack of performance, of any one of the operating parts or controls of the apparatus. To this end, there are provided in the apparatus two further timers, T1 and T2. These timers may, like the timer T3, be of any well known type, and each may be electrically operated and manually presettable to energize an enclosed relay (not shown) after a pre-determined period of operation of the timer. The timers T1 and T2 function successively in each automatic molding cycle of the apparatus, the timer T1 functioning during an initial part of each automatic molding cycle, i. e., until the "valve" and "solenoid" relays 696 and 698 are de-energized, and the timer T2 functioning during the remainder of each cycle. The operating circuits of the timers T1 and T2 include a rump portion, comprising the side L1' of the power line, the leads 654 and 656, the closed auxiliary switch 646 of the "main" switch 618, the leads 658 and 736, the contacts c, d of the switch 688 (which are normally engaged when the "initial-heat" relay 676 is de-energized), a lead 820, the bridged contacts B2, b2 of the "pressure" switch 604, a lead 822, the bridged contacts B2, b2 of the "arm" switch 598, and a lead 824. The remainder of the operating circuit of the timer T1 comprises the contacts c, d of a switch 826, a lead 828, the timer T1, leads 830 and 832, the bridged contacts B1, b1 of the "cycle-alarm" switch 592, and the other side L2 of the power line. The remainder of the operating circuit of the timer T2 comprises the contacts a, b of the switch 826, a lead 834, the timer T2, the leads 830 and 832, the bridged contacts B1, b1 of the "cycle-alarm" switch 592, and the other side L2 of the power line. The timers T2 and T1 are so set as to perform their respective functions of stopping the operation of the apparatus when in any automatic molding cycle of the time periods from the start of the cycle to the de-energization of the "valve" and "solenoid" relays 696 and 698, and from the de-energization of the latter relays to the end of the cycle, respectively, should exceed pre-determined maximum time periods, respectively, during which the apparatus will perform efficiently. In this connection, it will be observed from the wiring diagram in Fig. 14 that the described operating circuit of the timer T2 is closed in any automatic molding cycle of the apparatus while the "solenoid" relay 698 is energized and causes engagement of the contacts a, b of the switch 826. Conversely, the described operating circuit of the timer T1 is closed in any automatic molding cycle of the apparatus when the "solenoid" relay 698 is de-energized and the contacts c, d of the switch 826 are normally engaged.

Thus, if deficient operation of the apparatus during an initial part of any automatic molding cycle will not bring about de-energization of the "valve" and "solenoid" relays 696 and 698 within the maximum time period permitted in each cycle by the timer T2, the relay in the latter will then become energized and thereby close a normally open switch 860, resulting in closure of a first circuit of an "alarm" relay 840. This first circuit comprises the side L2 of the power line, a lead 842, the "alarm" relay 840, leads 844, 846 and 862, the then closed switch 860, leads 864 and 850, the normally bridged contacts 852 and 854 of the "start" switch 594, the lead 628 and the other side L1' of the power line. Energization of the "alarm" relay 840, in consequence of the closure of the circuit just described, results in opening of the switch 638 and, hence, in opening of the holding circuit of the "main" switch relay 620 and according opening of the "main" switch 618. On opening of the "main" switch 618, the auxiliary switches 640, 642, 644 and 646 thereof will return to their normally open positions shown in the wiring diagram, with the result that all terminals L1 in the electrical system are disconnected from the side L1' of the power line, and the circuit of the pump motor is interrupted, thus stopping the operation of the apparatus.

If the "valve" and "solenoid" relays 696 and 698 are, in any automatic molding cycle of the apparatus, de-energized within the time limit permissible by the set timer T2, the timer T1 assumes control over the remainder of the cycle. At that time in each automatic molding cycle, the contacts c, d of the switch 826 become normally engaged on de-energization of the "solenoid" relay 698, closing thereby the described operating circuit of the timer T1. If deficient performance of the apparatus will then not bring about closure of the previously described "restart" circuit of the "valve" and "solenoid" relays 696 and 698 within the maximum time period permitted by the timer T1, the relay in the latter will become energized and thereby close a normally open switch 838, resulting in closure of a "second" circuit of the "alarm" relay 840. This second circuit of the "alarm" relay 840 comprises the side L2 of the power line, the lead 842, the "alarm" relay 840, the leads 844 and 846, the then closed switch 838, lead 848, the lead 850, the normally bridged contacts 852, 854 of the "start" switch 594, the lead 628, and the side L1' of the power line. Closure of this "second" circuit of the "alarm" relay 840 will, as in the case of closure of the described "first" circuit thereof, result in immediate stoppage of the operation of the apparatus.

Assuming that the injection cylinder 64 holds a charge of molten plastic at proper molding temperature, the controls of the apparatus may then be set for a single automatic molding cycle, for the purpose of testing the cycle or for any other purpose. To this end, the "jog-run," "arm" and "pressure" switches 596, 598 and 604, respectively, are set the same as for automatic repeat cycle performance of the apparatus. However, the "cycle-alarm" switch 592 is, contrary to its described setting for "automatic-repeat" cycle performance of the apparatus, set so that the contacts A1, a1 and B2, b2 thereof are bridged. The "start" switch 594 is thereupon momentarily depressed for closing the normal starting circuit of the "main switch" relay 620. Immediately on closure of the "main" switch 618 in consequence of the closure of the "starting" circuit of the "main switch" relay 620, the normal holding circuit of the latter is closed. If the "cycle-alarm" switch 592 were set for automatic repeat-cycle performance of the apparatus, the normal circuit of the "arm" relay 700 would then be automatically closed for the purpose of causing closure of the starting circuit of the "valve" and "solenoid" relays 696 and 698, respectively. However, the "cycle-alarm" switch 592 being now differently set, the "arm" relay 700 will be energized by an auxiliary circuit which is closed on momentary depression by the operator of the "up" switch 600. This auxiliary circuit comprises a terminal L1, leads 870 and 872, the momentarily bridged contacts B2, b2 of the "up" switch 600, the lead 704, the "arm" relay 700, the leads 702 and 636, the normally closed "alarm" switch 638, and the side L2 of the power line. Assuming that the ejector arm 240 is, as it should be, in its "out" position at the time of the momentary depression of the "up" switch 600, according momentary energization of the "arm" relay 700 will result in closure of an auxiliary "starting" circuit of the "valve" and "solenoid" relays 696 and 698, respectively, and the present molding cycle will from here on be completed in exactly the same manner as the previously described molding cycle. The above-mentioned auxiliary "starting" circuit of the "valve" and "solenoid" relays 696 and 698 comprises the side L2 of the power line, the normally closed "down" switch 602, the leads 720 and 722 across which the "valve" and "solenoid" relays 696 and 698 are connected in parallel by the leads 724 and 726, respectively, the then closed switch 728, the lead 730, the contacts c, d of the "arm-out" switch 572 (which are engaged when the ejector arm 240 is in its "out" position), the leads 732, 734 and 880, the momentarily bridged contacts A2, a2 of the "up" switch 600, the lead 870 and a terminal L1. A repeat molding cycle will not take place at the end of the present molding cycle, because the circuit of the "arm" relay 700 will, despite closure of the "plunger" switch 584 and engagement of the contacts c, d of the "mold-out" switch 554, not be closed at the "cycle-alarm" switch 592 on account of the different setting of the latter, as described. If the ejector arm 240 should at the time of the momentary depression by the operator of the "up" switch 600, not be in normal "out" position, the above auxiliary "starting" circuit of the "valve" and "solenoid" relays 696 and 698 will not be closed by reason of the fact that the contacts c and d of the "arm-out" switch 572 will then not be engaged. Instead, the contacts a, b of the "arm-out" switch 572 will then be engaged, with the result that an auxiliary "arm-out" circuit of the arm motor 490 is closed in order to turn the spindle 242 in a direction to swing the ejector arm 240 into its "out" position. This auxiliary "arm-out" circuit of the arm motor 490 is between the common contacts b, c of the "arm-out" switch 572 and the side L1 of the power line at the "up" switch 600, the same as the above described auxiliary "starting" circuit of the relays 696 and 698, and the "arm-out" circuit of the arm motor 490 is completed by way of the then engaged contacts a, b of the "arm-out" switch 572, a lead 740, the arm motor 490, and the other side L2 of the power line. Thus, if the ejector arm 240 is not in its "out" position when the "up" switch 600 is depressed, closure of the auxiliary "starting" circuit of the "valve" and "solenoid" relays 696 and 698 is delayed until depression of the "up" switch 600 swings the arm 240 into its "out" position in which it causes engagement of the contacts c, d of the "arm-out" switch 572.

Any automatic molding cycle of the apparatus may be stopped instantaneously by momentary depression of the "stop" switch 590, resulting in opening of the holding circuit of the "main switch" relay 620 and according opening of the auxiliary switches of the "main" switch 618.

If, for any reason, it is desired during any automatic molding cycle of the apparatus to stop the bottom mold member 86 at any time during its closing stroke and to return it to its open position, the operator need merely depress the "down" switch 602 momentarily, opening thereby the then closed holding circuit of the "valve" and "solenoid" relays 696 and 698, respectively, as a result of which the described initial circuit of the solenoid winding W is interrupted at the switch 750. Opening of the initial circuit of the solenoid winding W and according de-energization of the latter at this time will, as may be observed from the hydraulic diagram in Fig. 13, result in the immediate exhaust of the top and bottom ends, and the simultaneous admission of fluid under low pressure to the bottom and top ends, respectively, of the actuating cylinder 192 and mold cylinder 102, respectively, thereby causing the return of the injection plunger 190 to its uppermost position and the return of the bottom mold member 86 to its lowermost position. The present molding cycle will thus be terminated as soon as the bottom mold member 86 reaches its lowermost position. If the "down" switch 602 is depressed at any other time during an automatic molding cycle of the apparatus, i. e., after the mold 54, 86 is closed, the cycle will take its regular course until the end thereof.

If the "stop" switch 590 is depressed while the mold 54, 86 is held closed by fluid under high pressure in any molding cycle of the apparatus, the latter will come to an immediate stop, as above explained. In that event, the "main" switch 619 is opened, with the result that all terminals L1 are disconnected from the side L1' of the power line. Thus, the holding circuit of the "valve" and "solenoid" relays 696 and 698 will be opened. Either the "initial" circuit or the "holding" circuit, of the solenoid winding W, whichever happens to be closed at the time of the depression of the "stop" switch 590, will also be opened, because either of these circuits depends for its closure on a terminal L1. The solenoid winding W will thus be de-energized when the "stop" switch 590 is depressed. On depression of the "stop" switch 590, there is immediately closed the "open" circuit of the valve motor 440. For convenience, this circuit is re-described as comprising the side L2 of the power line, the valve motor 440, the lead 770, the "sheet" switch 614, the lead 772, the contacts e, f of the "motor-limit and solenoid" switch 472 (which are engaged when the motor valve 320 is closed), the lead 774, the then normally closed switch 776, and the side L1' of the power line. The motor valve 320 will thus be opened, and the hydraulic system (Fig. 13) is then, in view of the prior stoppage of the pumps 288 and 290, in a condition in which the high pressure of the fluid in the cylinders 192 and 102 will be relieved, and the weight of the lower platen 30 and bottom mold member 86 thereon may force the fluid from the bottom end of the mold cylinder 102 past the valve element 338 in the "mold-closing" valve 314 and into the return conduit R.

Provisions are also made in the apparatus for jogging the bottom mold member 86 into its open and closed position in any desired steps. To this end, the "cycle-alarm" switch 592 is set to disconnect the contacts A2, a2 and B1, b1 thereof, thereby opening the described operating circuits of the timers T1 and T2 for the jogging operation. Also, the "run-jog" switch 596 is set to disconnect the contacts A2, a2 and B2, b2, and to bridge the contacts A1, a1 as shown in dot-and-dash lines in the wiring diagram (Fig. 15), thereby connecting directly the side power line L1' to the side power line L1, opening the "arm-in" circuit of the arm motor 490 and opening the circuit of the normal feeding of the plastic. Also, the "pressure" switch 604 is set to bridge the contacts A2, a2 and B2, b2. Having set the foregoing switches, as described, and with the bottom mold member 86 in its normal lowermost position when the apparatus is inoperative, the operator depresses the "up" switch 600, closing thereby a "jog" circuit of the "arm" relay 700 if the ejector arm 240 is at that time in its normal "out" position, as it should be. This "jog" circuit of the "arm" relay 700 comprises the side L2 of the power line, the normally closed switch 638, the leads 636 and 702, the "arm" relay 700, the lead 704, the bridged contacts B2, b2 of the "up" switch 600, the leads 872 and 870, and a terminal L1 (which is then connected with the side L1' of the power line in the present setting of the "run-jog" switch 596). With the ejector arm 240 in its "out" position, momentary energization of the "arm" relay 700 in consequence of momentary depression of the "up" switch 600, results in closure of a "jog" circuit of the "valve" and "solenoid" relays 696 and 698, respectively. This circuit comprises a terminal L1, the lead 870, the bridged contacts A2, a2 of the "up" switch 600, a lead 880, the leads 734 and 732, the contacts c, d of the "arm-out" switch 572 (which are engaged when the ejector arm 240 is in its "out" position), the lead 730, the then closed switch 728, the leads 722 and 720 across which the "valve" and "solenoid" relays 696 and 698, respectively, are connected in parallel by the leads 724 and 726, respectively, the normally closed "down" switch 602, and the side L2 of the power line. If at the time of the depression of the "up" switch 600, the ejector arm 240 is for some reason not in its "out" position, the described "jog" circuit of the "valve" and "solenoid" relays will not be closed, instead there will be closed an auxiliary "out" circuit of the arm motor 490 for the purpose of swinging the ejector arm 240 into its "out" position. This latter circuit comprises the side L2 of the power line, the arm motor 490, the lead 740, the then engaged contacts a, b of the "arm-out" switch 572, the leads 732, 734 and 880, the bridged contacts A2, a2 of the "up" switch 600, the lead 870, and a terminal L1. This circuit will, for the return of the ejector arm 240 into its "out" position, remain closed only while the operator holds the "up" switch 600 depressed, this being in contrast to the requirement of depressing the "up" switch only momentarily for causing closure of the described "jog" circuit of the "valve" and "solenoid" relays when the ejector arm 240 is at that time in its "out" position. Closure of the "jog" circuit of the "valve" and "solenoid" relays, either immediately on momentary depression of the "up" switch 600, or after prolonged depression of the latter if the ejector arm 240 has first to be swung into its "out" position, results in immediate closure of the "holding" circuit of the "valve" and "solenoid" relays 696 and 698, respectively. For convenience, this circuit is again described as comprising a terminal LI, the normally closed "over-run" switch 470, the lead 744, the then closed switch 742, the leads 722 and 720 (across which the "valve" and "solenoid" relays 696 and 698, respectively, are connected in parallel), the normally closed "down" switch 602, and the side L2 of the power line. Energization of the solenoid relay 698, in consequence of the successive closures of the "jog" and "holding" circuits thereof, results in closure of the switch 750, and accordingly in the closure of the "initial" circuit of the solenoid winding W.

With the solenoid winding W thus energized and the motor valve 320 in its open position, the operator need merely depress the "start" switch 594 in order to jog the bottom mold member 86 from its lowermost position into its closed position and back to its lowermost position. The jogging of the bottom mold member may at any time, except while the mold is held closed by fluid under high pressure, be interrupted as often as desired by simply releasing the start switch 594. Depression of the "start" switch 594 results in closure of a "jog" circuit of the "main switch" relay 320, which comprises the side LI' of the power line, the leads 628 and 630, the bridged contacts 624 and 626 of the "start" switch 594, the lead 632, the "main switch" relay 620, the lead 634, the normally closed "stop" switch 590, the lead 636, the normally closed switch 638, and the side L2 of the power line. Closure of the circuit just described results in closure of the circuit of the pump motor, as will be readily understood. Thus, each time the operator then depresses the "start" switch 594, fluid under low pressure is admitted into the top and bottom ends of the actuating cylinder 192 and mold cylinder 102, respectively, while their opposite ends are permitted to exhaust. The flow of fluid under low pressure to the cylinders 192 and 102 may, of course, be interrupted at any time on merely releasing the "start" switch 594, thus affording the operator the opportunity to stop the ascent of the bottom mold member 86 as often as desired and in any position whatever. When the bottom mold member 86 finally reaches its closed position after any number of jogs thereof, the "mold" switch 530 is closed. Closure of the "mold" switch 530 at this time results in closure of the normal "close" circuit of the valve motor 440 and according closure of the motor valve 320 (Fig. 7). When the motor valve 320 is closed, the gear disk 448 climbs on the valve element 380 to open the "over-run" switch 470 and thereby open the holding circuit of the "valve" and "solenoid" relays 696 and 698, respectively. Immediately on de-energization of the "valve" and "solenoid" relays, the "close" circuit of the valve motor 440 is opened at the switch 758, and the "open" circuit of the valve motor 440 is simultaneously closed at the switch 776 which closes on de-energization of the "valve" relay 696. On de-energization of the "valve" and "solenoid" relays 696 and 698 there is also opened the "initial" circuit of the solenoid winding W, but the "holding" circuit thereof is at that time already closed and remains closed until the motor valve 320 returns to its open position (Fig. 6) in which the valve element 380 thereof causes disengagement of the contacts c, d of the "motor-limit and solenoid" switch 472.

On closure of the motor valve 320, in consequence of the above-described closure of the "close" circuit of the valve motor 440, the mold 54, 86 is held closed by fluid under high pressure until the motor valve is re-opened and the solenoid winding W de-energized, as also described above. It thus follows that upward jogging of the bottom mold member 86, in consequence of manual depressions of the "start" switch 594, terminates when the mold 54, 86 is closed. Thereafter, and while the "start" switch 594 is depressed, the bottom mold member 86 is held in its closed position by fluid under high pressure for the same length of time as in a normal automatic molding cycle.

After the motor valve 320 is reopened and the solenoid winding W de-energized, the operator may again jog the bottom mold member 86 into its lowermost position by depressing the "start" switch 594, as will be readily understood.

If it is desired to "shoot" from the discharge nozzle 62 of the apparatus molten plastic which is burned or otherwise unsuitable for molding purposes, spacing blocks are interposed between the mold members 54, 86 in order to prevent their closure. Any suitable container is then placed underneath the discharge nozzle 62 into which the plastic may be shot. The shooting of molten plastic from the discharge nozzle 62 is accomplished by forcing the injection plunger 190 into its lowermost position, by means of fluid under high pressure, while the mold 54, 86 is open. For shooting plastic from the discharge nozzle 62, the controls of the apparatus are set or depressed in exactly the same fashion as for the above-described "jog" cycle, and a "shooting" cycle is exactly like a "jog" cycle up to the time when fluid under low pressure has forced the injection plunger 190 into the position from which the same will force plastic from the discharge nozzle 62 on the subsequent application of fluid under high pressure to the injection plunger. However, since the bottom mold member 86 is prevented from closing by the spacer blocks, the mold switch 530 will obviously not be closed in the regular course of events, with the result that the normal "close" circuit of the valve motor 440 will not be closed. The operator is, therefore, compelled to close an auxiliary circuit of the valve motor 440 by depressing the "shoot" switch 614. This auxiliary circuit of the valve motor 440 comprises the side L2 of the power line, the valve motor 440, the lead 768, the bridge contacts A2, a2 of the "pressure" switch 604, the lead 766, the then bridged contacts A, a of the depressed "shoot" switch 614, a lead 890, the lead 722, the then closed switch 742, the lead 744, the normally closed "over-run" switch 470, and a terminal LI. The pressure of the fluid in the system will not rise unless the operator simultaneously depresses the "start" switch 594 for the purpose of running the pumps 288 and 290. Thus when, by jogging, the mold member 86 has risen as high as permitted by the spacing blocks, the operator while continuing to depress the "start" switch 594, simultaneously depresses the "shoot" switch 604. The valve motor 490 will then be operated to cause closure of the motor valve 320 (Fig. 7), and when the motor valve 320 is then closed, the pressure of the fluid in the system will reach the predetermined high pressure, as determined by the valve 380, and be applied to the injection and mold plunger 190 and 164, respectively. For the subsequent shooting operation, the operator will hold the "shoot" switch 614 depressed in order to prevent closure of the "open" circuit of the valve motor 440 and according opening of the motor valve 320. The operator may now shoot the defective plastic from the discharge nozzle 62 by merely continuing to depress the "start" switch 594 to cause continued operation of the pump motor. When the defective plastic has been shot from the discharge nozzle 62, either before the injection plunger 190 reaches its lowermost position or when it reaches the latter position, the operator merely releases the "start" and "shoot" switches, with the result that the "open" circuit of the valve motor 440 is closed without manipulation of any further switch or switches. When the motor valve 320 reaches its open position (Fig. 6), the valve element 380 thereof causes disengagement of the contacts c, d of the "motor-limit and solenoid" switch 472, opening thereby the "holding" circuit of the solenoid winding W. Thus, with the motor valve 320 in its open position and the solenoid winding W de-energized, the hydraulic system of the apparatus is in condition for applying fluid under low pressure to the bottom and top ends of the cylinders 192 and 102, respectively. It is then merely necessary for the operator to depress the "start" switch 594 in order to cause operation of the pumps 288 and 290. The injection plunger 190 may thus be returned under power to its uppermost position for the next molding cycle of the apparatus.

In the event that a sprue s remains in the jaws 248 of the ejector arm 240 beyond the end of any molding cycle, when the controls of the apparatus are set for automatic repeat-molding cycles, the next molding cycle will be started and will take its normal course until the ascending bottom mold member 86 closes the "mold" switch 530. Simultaneously with the closure of the "close" circuit of the valve motor 440, there is then closed a "sprue" circuit of the "alarm" relay 840. This latter circuit comprises a terminal L1, the then closed switch 758, the leads 760 and 762, the "mold" switch 530, the leads 764 and 766, the bridged contacts A2, a2 of the "pressure" switch 604, the lead 768, a lead 894, a switch 896 which is then closed, a lead 898, the leads 846 and 844, the "alarm" relay 840, the lead 842, and the other side L2 of the power line. The switch 896 in the above "sprue" circuit of the "alarm" relay 840 is then closed by the "arm" relay 700 because the latter is still energized at this time in the present cycle due to the presence of a sprue s in the jaws 248 of the ejector arm 240. The circuit of the "arm" relay 700, which is then closed by virtue of a sprue s remaining in the jaws 248 of the ejector arm 240, comprises the side L2 of the power line, the normally closed switch 638, the leads 636 and 702, the "arm" relay 700, the leads 704 and 706, the bridged contacts A2, a2 of the "cycle-alarm" switch 592, the lead 708, the then closed "sprue" switch 536, the leads 734 and 760, the then closed switch 758, and a terminal L1. Thus, if a sprue s should remain in the jaws 248 of the ejector arm 240 beyond the end of a present molding cycle of the apparatus, an automatic repeat-molding cycle will start and take its regular course until the time at which fluid under high pressure would normally be applied in the apparatus, the latter being then rendered inoperative by the above-described energization of the "alarm" relay 840 and according opening of the holding circuit of the "main switch" relay 120.

If in any condition of the apparatus in which the terminals L1 are connected with the side L1' of the power line, and at any time when plastic is not automatically fed from the hopper 216 into the container 196, it is desired to feed plastic into the container 196, the operator need merely depress the "manual-feed" switch 612, closing thereby a circuit of the feed motor 220. This circuit comprises the side L2 of the power line, the feed motor 220, the leads 816 and 814, a lead 910, the bridged contacts A, a of switch 612, and a terminal L1.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. In thermo-plastic injection-molding apparatus having a separable mold, a cylinder with a piston therein adapted to close the mold on admission of fluid under pressure into said cylinder, the combination of a pressure pump, a conduit between said pump and cylinder, an exhaust passage branching from said conduit, a relief valve interposed in said passage and opened by fluid from said conduit under a pressure exceeding a certain low mold-closing pressure, a normally yieldingly closed second valve interposed in said passage, means for opening said second valve, and electrical means operative only on complete closure of the mold for permitting closure of said second valve, said second valve being opened, when closed, by fluid under a pressure higher than the opening pressure of said relief valve and lower than the maximum rated pressure of said pump.

2. In thermo-plastic injection-molding apparatus having a separable mold, a cylinder with a piston therein adapted to close the mold on admission of fluid under pressure into said cylinder, a chamber adapted to hold a plastic charge and having a discharge nozzle through which to inject the charge into the mold, and another cylinder with a plunger therein adapted to inject the charge through said discharge nozzle into the mold on admission of fluid under a certain high pressure into said other cylinder, the combination of a pressure pump, a conduit between said pump and cylinders, an exhaust passage branching from said conduit, a relief valve interposed in said passage and opened by fluid from said conduit under a pressure exceeding a certain low mold-closing pressure at which said plunger fails to inject the charge into the mold, a normally yieldingly closed second valve interposed in said passage, means for opening said second valve, and electrical means operative only on complete closure of the mold for permitting closure of said second valve, said second valve being opened, when closed, by fluid under a pressure higher than the opening pressure of said relief valve and lower than the maximum rated pressure of said pump.

3. In thermo-plastic injection-molding apparatus having a separable mold, and a cylinder with a piston therein adapted to close the mold on admission of fluid under pressure into said cylinder, the combination of a conduit between said cylinder and a source of fluid under pressure, an exhaust passage branching from said conduit, a relief valve interposed in said passage and opened by fluid from said conduit under a pressure exceeding a certain low mold-closing pressure below that of said fluid source, another valve interposed in said passage and shiftable into open and closed positions, and means operative on mold closure for shifting said other valve into its closed position and retain it in the latter position for a predetermined time period, and then shifting said other valve into its open position.

4. In thermo-plastic injection-molding apparatus having a separable mold, and a cylinder with a piston therein adapted to close the mold on admission of fluid under pressure into said cylinder, the combination of a conduit between said cylinder and a source of fluid under pressure, an exhaust passage branching from said conduit, a relief valve interposed in said passage and opened by fluid from said conduit under a pressure exceeding a certain low mold-closing pressure below that of said fluid source, another valve interposed in said passage and having a seat and a non-rotatable valve element normally axially urged into valve-closing relation with said seat, a member threaded on said valve element, a stop for limiting movement of said member toward said seat, and power means operative on mold closure for turning said member in one direction to permit closure of said valve element on said seat and cause axial movement of said member on the closed valve element away from said stop, and then turning said member in the opposite direction to return said member on the closed valve element into engagement with said stop and then retract said valve element from its seat.

5. In thermo-plastic injection-molding apparatus having a separable mold, and a cylinder with a piston therein adapted to close the mold on admission of fluid under pressure into said cylinder, the combination of a conduit between said cylinder and a source of fluid under pressure, an exhaust passage branching from said conduit, a relief valve interposed in said passage and opened by fluid from said conduit under a pressure exceeding a certain low mold-closing pressure below that of said fluid source, another valve interposed in said passage and having a seat and a non-rotatable valve element normally axially urged from an open position into closing relation with said seat, a gear threaded on said valve element, a reversible electric motor having a pinion axially extending parallel to the axis of said valve element and being in permanent mesh with said gear, a stop limiting axial movement of said gear toward said seat, a first electric circuit including first and second normally open switches for operating said motor to permit closure of said valve element on said seat, said first switch being closed on closure of the mold, a relay for closing said second switch, a holding circuit including a normally closed third switch and a normally open fourth switch for energizing said relay, said fourth switch being closed on energization of said relay and said third switch being opened by said gear on being axially moved on the closed valve element a certain distance away from said stop, means for momentarily energizing said relay, and a second electric circuit including normally closed fifth and sixth switches for operating said motor in the reverse direction, said fifth switch being opened by said relay and said sixth switch being opened by said valve element in its open position.

6. The combination in thermo-plastic injection-molding apparatus as set forth in claim 5, in which said third switch is adjustably mounted so as to be opened by said gear on said movement of the latter on the closed valve element through a variable distance away from said stop.

7. The combination in thermo-plastic injection-molding apparatus as set forth in claim 5, further comprising a chamber adapted to hold a plastic charge and having a discharge nozzle through which to inject the charge into the mold, and another cylinder with a plunger therein adapted to inject the charge through said discharge nozzle into the mold on admission into said other cylinder of fluid under a pressure higher than the opening pressure of said relief valve and lower than the pressure of said fluid source, said conduit being also in communication with said other cylinder.

8. In thermo-plastic injection-molding apparatus having a separable mold, and a cylinder with a piston therein adapted to close the mold on admission of fluid under pressure into said cylinder, the combination of a conduit between said cylinder and a source of fluid under pressure, an exhaust passage branching from said conduit, a relief valve interposed in said passage and opened by fluid from said conduit under a pressure exceeding a certain low mold-closing pressure below that of said fluid source, another valve interposed in said passage and having a seat and a valve element normally urged from an open position into valve-closing relation with said seat, a reversible electric motor for shifting said valve element, a first electric circuit including first and second normally open switches for operating said motor in a direction to permit closure of said valve element on said seat, said first switch being closed on closure of the mold, a relay for closing said second switch, a holding circuit including a normally closed third switch and a normally open fourth switch for energizing said relay, said fourth switch being closed on energization of said relay, means opening said third switch a predetermined time period after closure of said other valve, means for momentarily energizing said relay, and a second electric circuit including normally closed fifth and sixth switches for operating said motor in the reverse direction to return said valve element to its open position, said fifth switch being opened by said relay and said sixth switch being opened by said valve element in its open position.

9. In injection-molding apparatus having a separable mold providing a mold cavity and means operative on separation of the mold for stripping a molded article from the mold cavity, yieldingly closed jaws, and means for moving said jaws to and from the separated mold for causing them to grip a stripped article and remove it from the mold.

10. In thermo-plastic injection-molding apparatus having a separable mold, and a cylinder with a piston therein adapted to close the mold on admission of fluid under pressure into said cylinder, the combination of an arm swingable between a first position outside the mold and a second position inside the open mold, yielding jaws on said arm gripping a molded part on swinging said arm inwardly into its second position on partial opening of the mold, said jaws carrying the gripped part on swinging said arm outwardly into its first position, means opening said jaws on swinging said arm outwardly beyond its first position, a conduit between said cylinder and a source of fluid under pressure, an exhaust passage branching from said conduit, a relief valve interposed in said passage and opened by fluid from said conduit under a pressure exceeding a certain low mold-closing pressure below that of said fluid source, another valve interposed in said passage and having a seat and a valve element normally urged from an open position into valve-closing relation with said seat, a reversible electric motor for shifting said valve element, a first electric circuit including normally open first and second switches for operating said motor in a direction to permit closure of said valve element on said seat, said first switch being closed on closure of the mold, a first relay for closing said second switch, a holding circuit including a normally closed third switch and a normally open fourth switch for energizing said relay, said fourth switch being closed by said relay, means opening said third switch a predetermined time period after closure of said other valve, a second electric circuit including normally closed fifth and sixth switches for operating said motor in the reverse direction to return said valve element to its open position, said fifth switch being opened by said relay and said sixth switch being opened by said valve element in its open position, a starting circuit for said relay including normally open seventh and eighth switches of which said eighth switch is closed by said arm in its first position, a second relay for closing said seventh switch, and an energizing circuit for said second relay including normally open ninth and tenth switches which are closed by the mold when completely open and by said valve element in its open position, respectively.

11. The combination in thermo-plastic injection-molding apparatus as set forth in claim 10, in which said starting circuit further includes a normally open eleventh switch which is closed by a molded part gripped between said jaws.

12. The combination in thermo-plastic injection-molding apparatus as set forth in claim 10, further comprising a second electric motor for swinging said arm into its first position, and an energizing circuit for said second motor including said second switch and a normally closed twelfth switch which is opened by said arm in its first position.

13. The combination in thermo-plastic injection-molding apparatus as set forth in claim 10, further comprising a second reversible electric motor for swinging said arm into its first and second positions, an energizing circuit for operating said second motor in a direction to swing said arm into said second position, the latter circuit including said tenth switch, a normally closed thirteenth switch opened by said arm in its second position and a normally open fourteenth switch closed by the mold in said partially open condition, and another energizing circuit for operating said second motor in a direction to swing said arm into said first position, the latter circuit including said ninth and tenth switches, a normally open eleventh switch which is closed by a molded part gripped between the jaws, and a normally closed twelfth switch which is opened by said arm in its first position.

14. In thermo-plastic injection-molding apparatus having a separable mold, a first cylinder with a piston therein adapted to close the mold on admission of fluid under pressure into said cylinder, a chamber adapted to hold a plastic charge and having a discharge nozzle through which to inject the charge into the mold, and a second cylinder with a plunger therein adapted to inject the charge through said discharge nozzle into the mold on admission of fluid under a certain high pressure into said cylinder, the combination of an arm swingable between a first position outside the mold and a second position inside the open mold, yielding jaws on said arm gripping a molded part on swinging said arm inwardly into its second position on certain partial opening of the mold, said jaws carrying the gripped part on swinging said arm outwardly into its first position, means opening said jaws on swinging said arm outwardly beyond its first position, a conduit between said cylinders and a source of fluid under higher pressure than said certain high pressure, an exhaust passage branching from said circuit, a relief valve interposed in said passage and opened by fluid from said conduit under a pressure exceeding a certain mold-closing pressure lower than said certain high pressure, another valve interposed in said passage and having a seat and a valve element normally urged from an open position into valve-closing engagement with said seat, an electric heating element for heating a plastic charge in said chamber to proper molding temperature, a reversible electric motor for shifting said valve element, a first electric circuit including normally open first and second switches for operating said motor in a direction to permit closure of said valve element on said seat, said first switch being closed on closure of the mold, a first relay for closing said second switch, a holding circuit, including a normally closed third switch and a normally open fourth switch, for energizing said relay, said fourth switch being closed by said relay, means opening said third switch a pre-determined time period after closure of said other valve, a second electric circuit, including normally closed fifth and sixth switches, for operating said motor in the reverse direction to return said valve element to its open position, said fifth and sixth switches being opened by said relay and by said valve element in its open position, respectively, an initial starting circuit for said relay including normally open seventh, eighth and ninth switches of which said eighth switch is closed by said arm in its first position, a second relay for closing said seventh switch, an energizing circuit for said second relay including normally open tenth and eleventh switches which are closed by the open mold and by said valve element in its open position, respectively, said parallel circuits having a common normally closed heat-responsive switch which opens when a plastic charge in said chamber reaches proper molding temperature, and a cycle-restart circuit for said first relay including said seventh, eighth and eleventh switches.

15. In thermo-plastic injection-molding apparatus having a separable mold, and a cylinder with a double-acting piston therein adapted to open and close the mold on admission of fluid under pressure into the mold-opening and mold-closing ends, respectively, of said cylinder, the combination of a pressure pump, a first valve having first, second and third chambers, and a first valve element normally urged into a first position in which to provide and intercept communication between said first and second chambers and between said second and third chambers, respectively, and shiftable, by fluid under pressure admitted into one end of said valve, into a second position in which to intercept and provide communication between said first and second chambers and between said second and third chambers, respectively, a second valve having fourth, fifth and sixth chambers, and a second valve element normally urged into a first position in which to intercept and provide communication between said fourth and fifth chambers and between said fifth and sixth chambers, respectively, and shiftable, by fluid under pressure admitted into one end of said second valve, into a second position in which to provide and intercept communication between said fourth and fifth chambers and between said fifth and sixth chambers, respectively, a first conduit between said pump and first and fourth chambers of said first and second valves, respectively, a second conduit between said second chamber of said first valve and said mold-closing end of said cylinder, a third conduit between said fifth chamber of said second valve and said mold-opening end of said cylinder, a third valve having seventh, eighth and ninth chambers, and a third valve element normally urged into a first position in which to provide and intercept communication between said seventh and eighth chambers and between said eighth and ninth chambers, respectively, means for shifting said third valve element into a second position in which to intercept and provide communication between said seventh and eighth chambers and between said eighth and ninth chambers, respectively, a fourth conduit between said eighth chamber of said third valve and said one ends of said first and second valves, respectively, an exhaust conduit communicating with said third, sixth and ninth chambers of said first, second and third valves, respectively, a first passage between said first conduit and exhaust conduit, said passage including said seventh chamber of said third valve, a relief valve interposed in said passage between said exhaust conduit and said seventh chamber of said third valve, said relief valve being opened by fluid from said first conduit when exceeding a certain low mold-closing pressure, a normally yieldingly closed fourth valve interposed in said passage between said first conduit and seventh chamber of said third valve, and means for opening said fourth valve and for permitting its closure, said fourth valve being opened, when closed, by fluid under a pressure higher than the opening pressure of said relief valve and lower than the maximum rated pressure of said pump.

16. The combination in thermo-plastic injection-molding apparatus as set forth in claim 15, further comprising another chamber adapted to hold a plastic charge and having a discharge nozzle through which to inject the charge into the mold, and another cylinder with a double-acting plunger therein adapted to inject the charge through said discharge nozzle and be retracted from said other chamber on admission of fluid under said predetermined high pressure and under said certain low pressure, respectively, into the plunger-advancing and plunger-retracting ends, respectively, of said other cylinder, said second and third conduits being also in communication with said plunger-advancing and plunger-retracting ends, respectively, of said other cylinder.

17. The combination in thermo-plastic injection-molding apparatus as set forth in claim 15, further comprising a second large-capacity pump for delivering fluid under a pressure above that at which said relief valve opens, another conduit between said first conduit and said second pump, a check valve interposed in said other conduit and permitting the flow of fluid into said first conduit only, a third passage connecting said exhaust conduit with said other conduit between said second pump and check valve, and another check valve interposed in said third passage and opened by fluid from said other conduit at a pressure higher than that at which said relief valve opens and lower than the maximum rated pressure of said second pump, the other pump being of small capacity.

18. In thermo-plastic injection molding apparatus having a separable mold, and a cylinder with a piston therein adapted to close the mold on admission of fluid under pressure into said cylinder, a control valve for said cylinder, said valve comprising a seat and a non-rotatable valve element normally axially urged into valve-closing relation with said seat, a member threaded on said valve element, a stop for limiting movement of said member toward said seat, and means for turning said member in one direction to permit closure of said valve element on said seat and cause axial movement of said member on the closed valve element away from said stop, and for turning said member in the opposite direction to return said member on the closed valve element into engagement with said stop and then retract said valve element from its seat.

LEON KARDORFF.

REFERENCES CITED

The following references are of record in the file of this patent:

UNITED STATES PATENTS

| Number | Name | Date |
|---|---|---|
| 2,107,190 | Shaw | Feb. 1, 1938 |
| 2,211,370 | Ernst et al. | Aug. 13, 1940 |
| 2,267,644 | Ernst | Dec. 23, 1941 |
| 2,277,640 | Harrington | Mar. 24, 1942 |
| 2,293,334 | Ernst | Aug. 18, 1942 |
| 2,386,697 | Lynch | Oct. 9, 1945 |